United States Patent
Jacobs

(10) Patent No.: US 7,821,799 B2
(45) Date of Patent: Oct. 26, 2010

(54) RIPPLE REDUCTION FOR SWITCH-MODE POWER CONVERSION

(76) Inventor: Mark E. Jacobs, 7615 Applecross La., Dallas, TX (US) 75248

( * ) Notice: Subject to any disclaimer, the term of this patent is extended or adjusted under 35 U.S.C. 154(b) by 553 days.

(21) Appl. No.: 11/854,236

(22) Filed: Sep. 12, 2007

(65) Prior Publication Data

US 2008/0101099 A1    May 1, 2008

Related U.S. Application Data

(60) Provisional application No. 60/863,440, filed on Oct. 30, 2006.

(51) Int. Cl.
*H02M 1/14* (2006.01)
(52) U.S. Cl. .............................. 363/47; 363/69; 323/361
(58) Field of Classification Search .................. 363/45, 363/69, 15, 44, 46–48, 67, 70, 89–93, 125–127; 323/361
See application file for complete search history.

(56) References Cited

U.S. PATENT DOCUMENTS

| | | | | |
|---|---|---|---|---|
| 5,038,263 | A * | 8/1991 | Marrero et al. ................. | 363/20 |
| 5,166,869 | A * | 11/1992 | Hesterman .................... | 363/25 |
| 6,009,004 | A * | 12/1999 | Swamy ........................ | 363/47 |
| 6,163,466 | A | 12/2000 | Davila, Jr. et al. | |
| 6,317,341 | B1 * | 11/2001 | Fraidlin et al. ............ | 363/56.09 |
| 6,693,805 | B1 * | 2/2004 | Steigerwald et al. .......... | 363/39 |
| 7,142,440 | B2 | 11/2006 | de Rooij et al. | |

FOREIGN PATENT DOCUMENTS

WO    WO 2005034319 A1 *    4/2005

OTHER PUBLICATIONS

Gao, X., et al., "A High-Performance, Integrated Magnetics Scheme for Buck-Cascaded Push-Pull Converter," IEEE Power Electronics Letters, Mar. 2004, pp. 29-33, vol. 2, No. 1, IEEE.
Gao, X., et al., "Integrated Magnetics Scheme for ZVS Hybrid Converter with Improved Performance," 2004 35th Annual IEEE Power Electronics Specialists Conference, Jun. 20, 2004, pp. 3681-3687, IEEE.

(Continued)

*Primary Examiner*—Harry Behm
(74) *Attorney, Agent, or Firm*—Slater & Matsil, L.L.P.

(57) ABSTRACT

A power converter includes an isolated or a nonisolated current-doubler rectification circuit including two magnetic circuit elements, each magnetic circuit element formed with a primary winding and a voltage-sensing winding. The primary windings are coupled in series. The voltage-sensing windings are also coupled in series but with a coupling sense opposite from that of the primary windings. A properly sized inductor and capacitor are coupled in series with the voltage-sensing windings to produce a ripple-cancellation current with slope opposite to a net slope error of currents produced in the two magnetic circuit elements. The current-doubler rectification circuit is preferably coupled to a rectangular ac input waveform. By sensing a scaled voltage difference between two magnetic circuit elements, a very low level of output ripple is produced by the circuit with very low power losses over a range of operating conditions.

20 Claims, 14 Drawing Sheets

OTHER PUBLICATIONS

Hamill, D.C., et al., "A 'Zero' Ripple Technique Applicable to Any DC Converter," IEEE Power Electronics Specialists Conference, Jun. 27, 1999, pp. 1165-1171, vol. 2, IEEE.

Pietkiewicz, A., et al., "Coupled-Inductor Current-Doubler Topology in Phase-Shifted Full Bridge DC-DC Converter," IEEE Proceedings of INTELEC 1998, paper 2-3, 9 pages, IEEE.

Schutten, M. J., et al., "Ripple Current Cancellation Circuit," IEEE Applied Power Electronics Conference, 2003, pp. 464-470, IEEE.

Severns, R.P., et al., "Modern DC-to-DC Switchmode Power Converter Circuits," 1985, pp. 280-294, Van Nostrand Reinhold Co., New York.

Xu, P., et al., "A Novel Integrated Current Doubler Rectifier," IEEE Applied Power Electronics Conference 2000, pp. 735-740, IEEE.

Yan, L., et al., "Integrated Magnetic Full Wave Converter with Flexible Output Inductor," IEEE Applied Power Electronics Conference 2002, pp. 824-830.

* cited by examiner

RIPPLE REDUCTION FOR SWITCH-MODE POWER CONVERSION

This application claims the benefit of U.S. Provisional Application No. 60/863,440, entitled "Ripple Reduction for Switch-Mode Power Conversion," filed on Oct. 30, 2006, which is incorporated herein by reference.

TECHNICAL FIELD OF THE INVENTION

The invention is directed in general to power converters and, more specifically, to a switch-mode power converter with reduced ripple at an output thereof.

BACKGROUND

A power converter is a power supply or power processing circuit that converts an input voltage waveform into an output voltage waveform. Important characteristics of power converters are the ability to regulate accurately a characteristic of the output voltage waveform such as a dc voltage level, the ability to produce the output voltage waveform with a low level of ripple voltage, and the ability to execute the power conversion process with high efficiency. Power conversion efficiency is the ratio of power converter output power to input power.

Early designs of power converters generally employed dissipative regulators to regulate the output characteristic, which inherently produce a "quiet" voltage waveform without added ripple. However, more recent designs of power converters frequently employ a "switch-mode" circuit topology in place of a less efficient dissipative regulator. In a switch-mode power converter, a power switch is periodically turned fully on and fully off with a "duty cycle," and operates in conjunction with reactive circuit elements such as inductors and capacitors to perform the power conversion function. Ideally, operating a power switch only in an on and off condition and the use of reactive circuit elements enables the design of a power converter with high power conversion efficiency. However, ripple components are produced at an input and an output of the power converter by the switching action of the power switch, which requires inclusion of a filter for their attenuation.

A filter is generally formed with further reactive circuit elements, i.e., inductors and capacitors, which contribute to power losses in the circuit. Losses in a power switch can generally be managed by providing a switch of suitable size, and by controlling simultaneous application of voltage and current to the switch during transitions between conducting and nonconducting states. But inductors and other magnetic circuit elements are generally formed with multiple layers of copper windings wound around dissipative core materials such as soft ferrites, and sustain power losses in the windings due to skin and proximity effects. Losses in magnetic circuit elements are managed by careful design of the winding geometry, choice of magnetic materials, and the physical size of conductors. Nonetheless, a significant challenge remains for a circuit designer to find a suitable design strategy for a magnetic circuit element with sufficiently low power dissipation characteristics for the more difficult applications.

Thus, despite the use of switch-mode power conversion circuit topologies and careful design of components used therein, market needs for the more challenging applications require further increases in the efficiency of a power converter beyond those presently being achieved. In accordance therewith, a filtering technique for a switch-mode power converter that provides a low level of ripple at an output thereof without incurring substantial power losses would be a beneficial improvement to meet these market needs.

SUMMARY OF THE INVENTION

These and other problems are generally solved or circumvented, and technical advantages are generally achieved, by advantageous embodiments of the invention that include a switch-mode power converter including a filter to attenuate a ripple current produced therein. The filter is formed with a plurality of magnetic circuit elements that form at least two current paths that are coupled at a common node. A current in one path is produced with a current slope roughly opposite to that of a current in other paths to produce a summed current with reduced ripple at the common node. In an advantageous embodiment, the switch-mode power converter further includes a ripple-cancellation circuit configured to sense a scaled error voltage in the filter, and produce a ripple-cancellation current that is injected into the common node to reduce ripple current components further. In an advantageous embodiment, the ripple-cancellation circuit senses the scaled error voltage employing windings in magnetic circuit elements. In an advantageous embodiment, the windings are coupled to two magnetic circuit elements to sense an error voltage. In an advantageous embodiment, the ripple-cancellation circuit includes an inductor coupled to the windings to produce the ripple-cancellation current. In an advantageous embodiment, a plurality of magnetic circuit elements is formed as an integrated magnetics structure. In an advantageous embodiment, the filter is a low-pass filter.

In a further advantageous embodiment, a switch-mode power converter includes a current-doubler rectification circuit that can produce a reduced level of ripple current, and a method of forming and operating the same. The current-doubler rectification circuit is formed with at least two magnetic circuit elements that provide at least two current paths coupled to a common node. A current in one path is produced with a current slope roughly opposite to a current slope of current in the other path(s) to produce a summed current with reduced ripple at the common node. The power converter includes an input and an output. In an advantageous embodiment, the current-doubler rectification circuit is coupled to an ac voltage source. In an advantageous embodiment, an inverter employing a power switch configured to conduct periodically for a duty cycle and coupled to the input produces the ac voltage source. In an advantageous embodiment, the inverter is formed, without limitation, with an active-clamp switching topology.

In an advantageous embodiment, the current-doubler rectification circuit includes two magnetic circuit elements, each including a primary winding that are coupled in series and to the ac voltage source. A voltage-sensing winding is included in each magnetic circuit element. The voltage-sensing windings are also coupled in series, but in a coupling sense opposite to that of the coupling sense of the primary windings. The voltage-sensing windings are thereby configured to sense an error voltage that is a scaled voltage difference between voltages formed across the two magnetic circuit elements to produce a ripple-canceling current in an inductor. In an advantageous embodiment, the inductor should be properly sized with respect to characteristics of the magnetic circuit elements. The inductor and a blocking capacitor are coupled in series with the voltage-sensing windings and an output node, where the ripple-canceling current is injected. The error voltage is scaled by a turns ratio of windings in the magnetic circuit elements.

In an advantageous embodiment, the ac voltage produced by the inverter is substantially a rectangular waveform. In an advantageous embodiment, the magnetic circuit elements are inductors. In a further advantageous embodiment, the magnetic circuit elements are transformers. In an advantageous embodiment, the current-doubler rectification circuit includes a first diode and a second diode, each diode respectively coupled to a winding of one of the magnetic circuit elements and the output node. In an advantageous embodiment, the diodes are formed with active switches, commonly referred to as "synchronous rectifiers." When the diodes are formed with active switches, a power flow between the input and the output may be reversed. In a further advantageous embodiment, the magnetic circuit elements are formed as an integrated magnetics structure. In a further advantageous embodiment, another magnetic circuit element is coupled to the voltage-sensing windings to reduce an effective number of turns therein.

A current-doubler rectification circuit with an output node as introduced herein is powered from an ac voltage source that may be formed by circuits other than an inverter, such as by an alternator. In an advantageous embodiment, the current-doubler rectification circuit includes a first magnetic circuit element with a first primary winding and a first voltage-sensing winding, a second magnetic circuit element with a second primary winding coupled in series with the first primary winding and the ac voltage source. The second magnetic circuit element includes a second voltage-sensing winding coupled in series with the first voltage-sensing winding with a coupling sense opposite to the coupling sense of the first and second primary windings. The current-doubler rectification circuit further includes an inductor coupled in series with the voltage-sensing windings and the output node.

A current-doubler rectification circuit, advantageously formed according to the principles of the invention, includes magnetic circuit elements contained therein adapted to a characteristic of the ac voltage source to produce a low level of output ripple voltage at a preselected duty cycle of the ac voltage source. The magnetic circuit elements can produce a low level of output ripple voltage at a preselected duty cycle by matching roughly an increasing slope of current in one magnetic circuit element with a decreasing slope of current in the other. The current-doubler rectification circuit further reduces the level of output ripple voltage by sensing a scaled voltage difference of voltages produced in the magnetic circuit elements, and producing therefrom a ripple-cancellation current that advantageously matches the error in the current slopes, and which is injected with the proper polarity into the output to cancel remaining ripple components.

The foregoing has broadly outlined preferred and alternative features of the invention so that those skilled in the art may understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
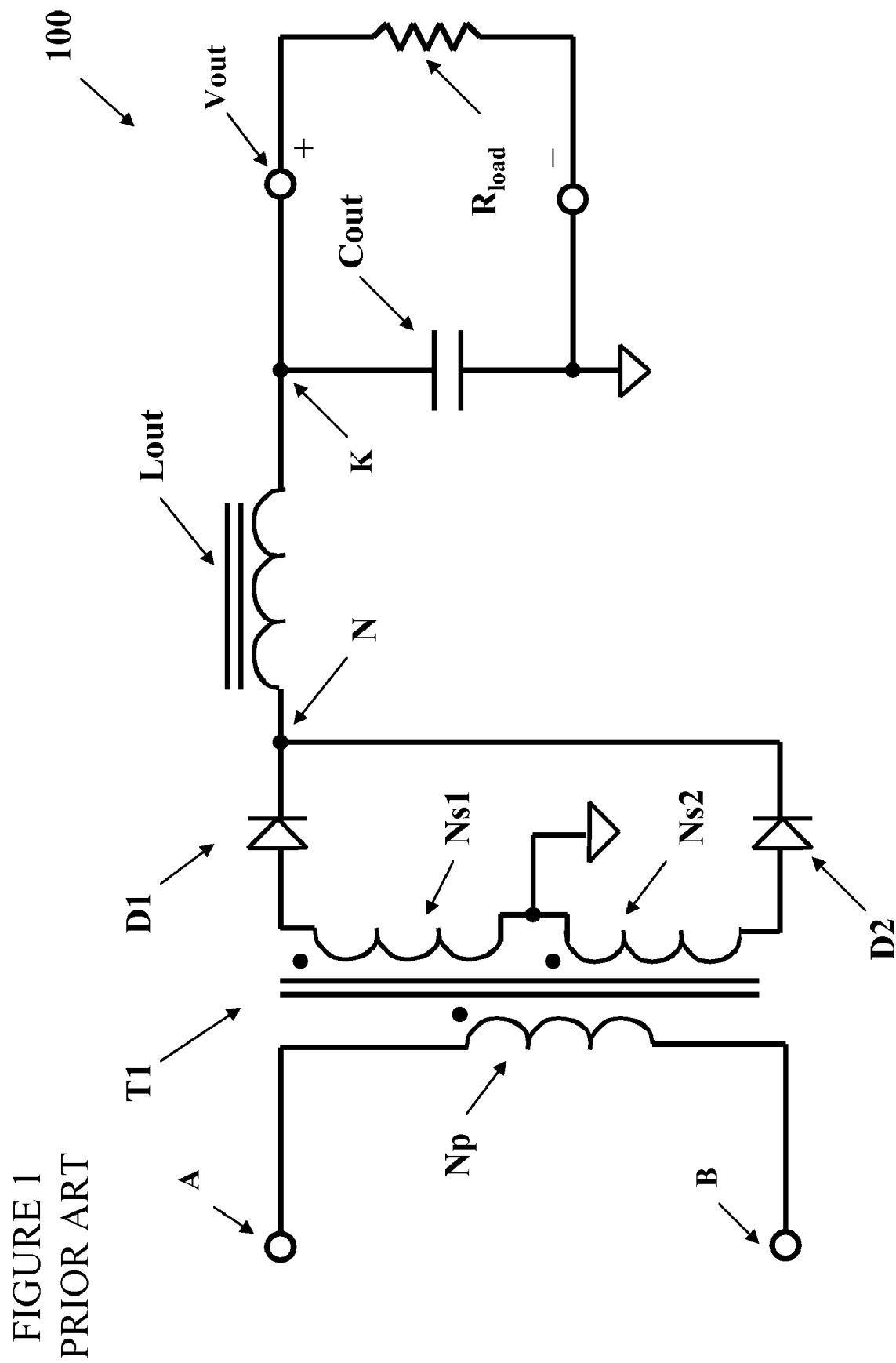
FIG. 1 illustrates a diagram of a rectification circuit of the prior art conventionally used in a switch-mode power converter to produce a dc output voltage.

The specific embodiments of the invention discussed hereinbelow provide particular ways of implementing the invention, and are not provided to limit the scope thereof, or the context in which they are applied. The invention will be described with respect to preferred embodiments employing various switch-mode power conversion topologies that may benefit from a circuit to cancel or reduce a ripple current at an output thereof. The principles of the invention, however, may be applied to other types of power converters including, without limitation, motor controllers, power amplifiers, and other applications wherein a switch-mode power conversion circuit may be used to convert an input voltage waveform into an output voltage waveform. The language "switch-mode power conversion" as used herein includes power converter circuits including diodes passively coupled to an ac voltage source to produce a rectified output voltage.

A current-doubler rectification circuit is described that advantageously can produce a very low level of output ripple current. An ordinary current-doubler rectification circuit utilizes two magnetic circuit elements to filter output current, each magnetic circuit element conducting a portion of the output current. Ideally, each magnetic circuit element conducts roughly half of the output current. A current-doubler rectification circuit operates with an increasing current in one magnetic circuit element and a decreasing current in the other, the two currents roughly oppositely matched in slope so that a low level of ripple current is produced by their sum at the output. A current-doubler rectification circuit is a favored circuit for high-current applications because the output current is shared by two magnetic circuit elements, and because they can be configured to conduct current with roughly oppositely matched slopes at a preselected duty cycle.

A current-doubler rectification circuit, constructed in accordance with the principles of the invention, provides a further level of output ripple current reduction by sensing a voltage error that is a scaled voltage difference of voltages produced in the magnetic circuit elements to determine a slope difference in the roughly oppositely matched currents, and injects a ripple-cancellation current into the output that advantageously mirrors the slope difference. The magnetic circuit elements may be integrated into a single magnetic structure. The result of these tandem ripple-reduction processes, even in a practical circuit implementation, can be an exceptionally low level of output ripple current. The circuit that injects the ripple-cancellation current conducts only modest levels of current in comparison with the main output current path, and can be formed with comparatively small components.

An ordinary current-doubler rectification circuit can be constructed, without limitation, in two forms. One form utilizes two transformers with primary windings coupled in series, utilizing magnetizing inductance of each transformer to generate a ripple-reduction effect. A second form utilizes one transformer with a secondary winding coupled to two inductors. The second form may also omit the transformer, and couple the two inductors across an ac input voltage source. In either form, each inductor produces roughly half the output current. The ripple reduction processes introduced herein that sense a scaled voltage difference between two magnetic devices to inject a ripple-cancellation current are operable with either form.

Turning first to FIG. 1, illustrated is a rectification circuit 100 of the prior art that is conventionally used in switch-mode power converters to produce a dc output voltage Vout for a load $R_{load}$, typically with some level of ripple voltage in the output voltage Vout. The circuit 100 is coupled at input nodes A and B to an inverter of a switch-mode power converter (not shown in the figure) that provides a high frequency ac voltage waveform at input nodes A and B, which waveform may be characterized with a duty cycle D and a switching frequency $f_s$. In many power conversion arrangements, the high frequency ac waveform applied at input nodes A and B is a substantially rectangular waveform. In alternative power conversion arrangements, the ac waveform may include curved waveform portions such as produced by resonant or quasi-resonant converter circuit topologies. The ac waveform may also include sloped waveform portions as typically produced by a switch-mode inverter. The rectification circuit generally includes a transformer T1 coupled to a pair of diodes D1 and D2 that rectify the ac waveform that is produced across transformer secondary windings Ns1 and Ns2 to produce a rectified waveform. The rectified waveform at node N, which includes both dc and ac voltage components, is filtered by the output filter comprising inductor Lout and capacitor Cout to produce a filtered output voltage Vout.

To reduce ripple-voltage components at node N, and correspondingly at output node K, the secondary winding of the transformer T1 may be tapped as illustrated in the figure to form an upper secondary winding Ns1 and a lower secondary winding Ns2. The secondary windings are often grounded to local circuit ground at a common node as illustrated in the figure. If the high-frequency waveform coupled to input nodes A and B is a rectangular, symmetric waveform, i.e., if the waveform duty cycle is 50% and the waveform exhibits equal positive and negative voltage excursions, then high-frequency ripple components at node N are small if the transformer secondary winding is center-tapped, producing filtered output ripple voltage components at node K that are smaller still. However, in a typical application, the waveform coupled to the input nodes A and B has a duty cycle different from 50%, and the positive and negative voltage excursions of the waveform are unequal in order to preserve a steady-state volt-second balance across transformer T1. In addition, the waveform may not be a rectangular waveform. Under these operating conditions, the voltage at node N contains substantial high-frequency ac components that are attenuated by the output filter, leaving attenuated but nonetheless residual ac ripple voltage components at output node K.

U.S. Pat. No. 5,327,333, entitled "Push-Push DC-DC Reduced/Zero Voltage Switching Converter With Off-Set Tapped Secondary Winding," by Farrington, et al., which is incorporated herein by reference, is directed to choosing a ratio of turns between secondary windings Ns1 and Ns2 depending on a duty cycle D to reduce ac voltage components at node N. However, the approach described by Farrington, et al., cancels ripple components at node N only at a predetermined duty cycle. Recognizing that duty cycle for a power converter is typically variable under practical operating conditions, substantial ripple reduction occurs only at a nominal operating point, forcing a designer to rely on attenuation characteristics of the output filter with its attendant losses to provide necessary ripple reduction over a range of operating conditions.

Output filtering components such as the inductor Lout and the capacitor Cout are often required to be of substantial size when using the circuit illustrated in FIG. 1, even when tapping the secondary winding of the transformer T1. A particular concern is the substantial current carried by the output inductor, which is typically formed with multiple heavy turns of copper to provide a necessary inductance with low power dissipation. Nonetheless, high-frequency components of current carried by an output inductor and the many winding turns induce substantial power losses due to skin and proximity effects. Although the circuit illustrated in FIG. 1 provides substantial advantages in efficiency, further improvements have been sought in view of its inherently limited ripple reduction capability and its power loss characteristics.

Steigerwald and Schutten in U.S. Pat. No. 6,693,805, entitled "Ripple Cancellation Circuit for Ultra-Low-Noise Power Supplies," and in a related paper by Steigerwald, et al., entitled "Ripple Current Cancellation Circuit," published in IEEE Applied Power Electronics Conference and Exposition, Vol. 1, 9-13 Feb. 2003, pp. 464-470, which are incorporated herein by reference, describe an improvement for the circuit illustrated in FIG. 1 to reduce ac voltage ripple components at output node K.

Figure 2:
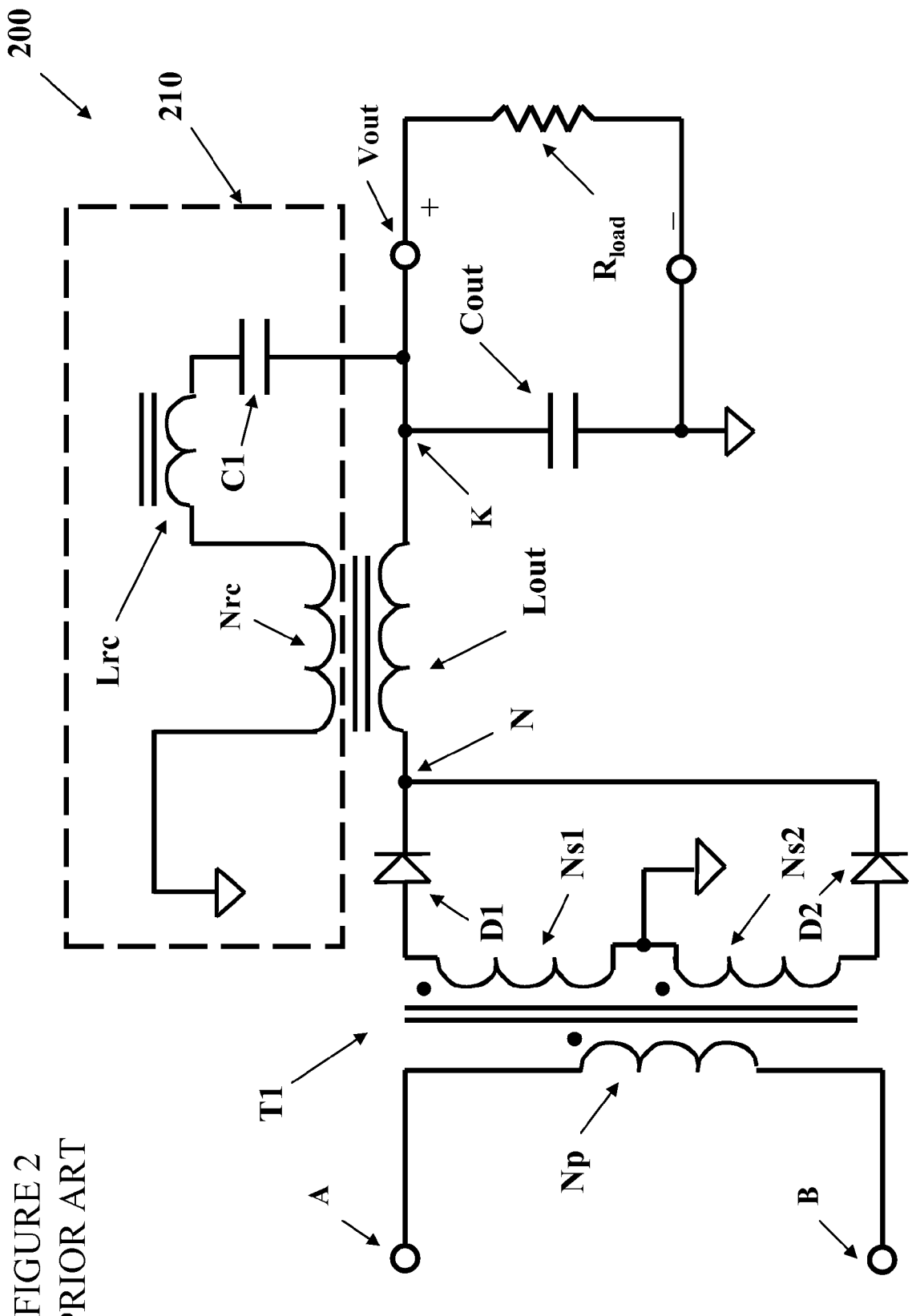
FIG. 2 illustrates a diagram of a rectification circuit using an output filter of the prior art.

Turning now to FIG. 2, illustrated is a rectification circuit 200 as described by Steigerwald and Schutten, including ripple-cancellation circuit 210 coupled to node K. Ripple cancellation circuit 210 injects a ripple-cancellation current into node K that ideally contains ac ripple components equal and opposite to those carried by inductor Lout. Steigerwald and Schutten describe coupling a ripple-cancellation circuit to a voltage source with dc and ac voltage components, adding ripple-cancellation winding Nrc to the inductor Lout with a certain turns ratio, and coupling the added winding in series with a small inductor Lrc and capacitor C1 to generate a ripple-canceling current with a roughly mirroring slope. A dc voltage is thereby produced at output node K with substantially reduced ripple. The circuit described by Steigerwald and Schutten provides two current path for output current, i.e., one path through the primary winding of inductor Lout, and one through the secondary winding. However, Steigerwald and Schutten do not sense a current slope error between the two paths to inject a further ripple-cancellation current. Remaining elements in a FIGURE herein corresponding to similarly numbered elements in a previous FIGURE will not be redescribed in the interest of brevity.

Figure 3:
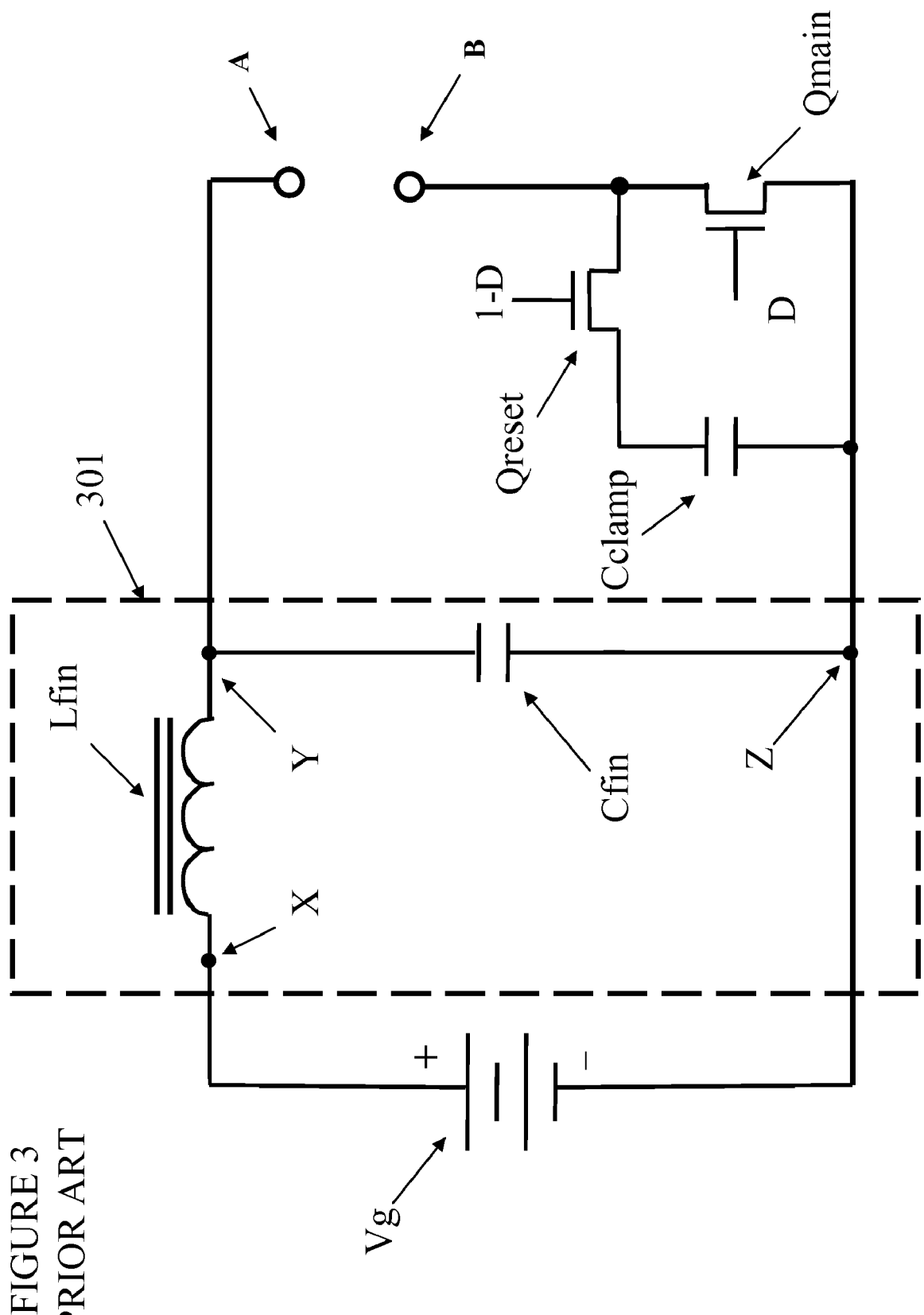
FIG. 3 illustrates a diagram of an exemplary inverter circuit commonly used in switch-mode power converters to produce a high-frequency waveform.

Turning now to FIG. 3, illustrated is an exemplary inverter circuit topology commonly used in switch-mode power converters to produce a high-frequency waveform across terminals A and B as discussed hereinabove with reference to FIGS. 1 and 2. Terminals A and B in FIG. 3 (as in following FIGUREs) are coupled to respective terminals A and B in FIGS. 1 and 2. The circuit illustrated in FIG. 3 is generally referred to as an "active clamp," and is powered from an input voltage source, illustrated in the figure by the battery Vg. The circuit includes a main power switch Qmain and a reset power switch Qreset that are enabled to conduct in a complementary manner with duty cycle D and 1-D, respectively, at inverter switching frequency $f_s$. The reset power switch Qreset is coupled in series with clamp capacitor Cclamp. The clamp capacitor Cclamp coupled to the negative terminal of the battery Vg can alternatively be coupled to the positive terminal of the battery Vg. Two clamp capacitors can also be used, one coupled to the negative terminal of the battery Vg, and one to the positive terminal. An active clamp inverter is typically coupled to an input filter 301 including inductor Lfin and capacitor Cfin to attenuate the pulsed input current components produced by the inverter that are conducted back to the voltage source, the battery Vg. The active clamp inverter is described by B. Carsten in the paper entitled "High Power SMPS Require Intrinsic Reliability," Proceedings of the Third International PCI Conference, Sep. 14, 1981, pp. 118-133, and is analyzed further by C. S. Leu, et al., in the paper entitled "Comparison of Forward Topologies with Various Reset Schemes," VPEC Seminar Proceedings, Sep. 15-17, 1991, pp. 101-109, Vol. 9, Virginia Power Electronics Center, Blacksburg, Va. The active clamp inverter is described further by P. Vinciarelli in U.S. Pat. No. RE-36,098, entitled "Optimal Resetting of the Transformer's Core in Single-Ended Forward Converters." The aforementioned references are incorporated herein by reference.

Figure 4:
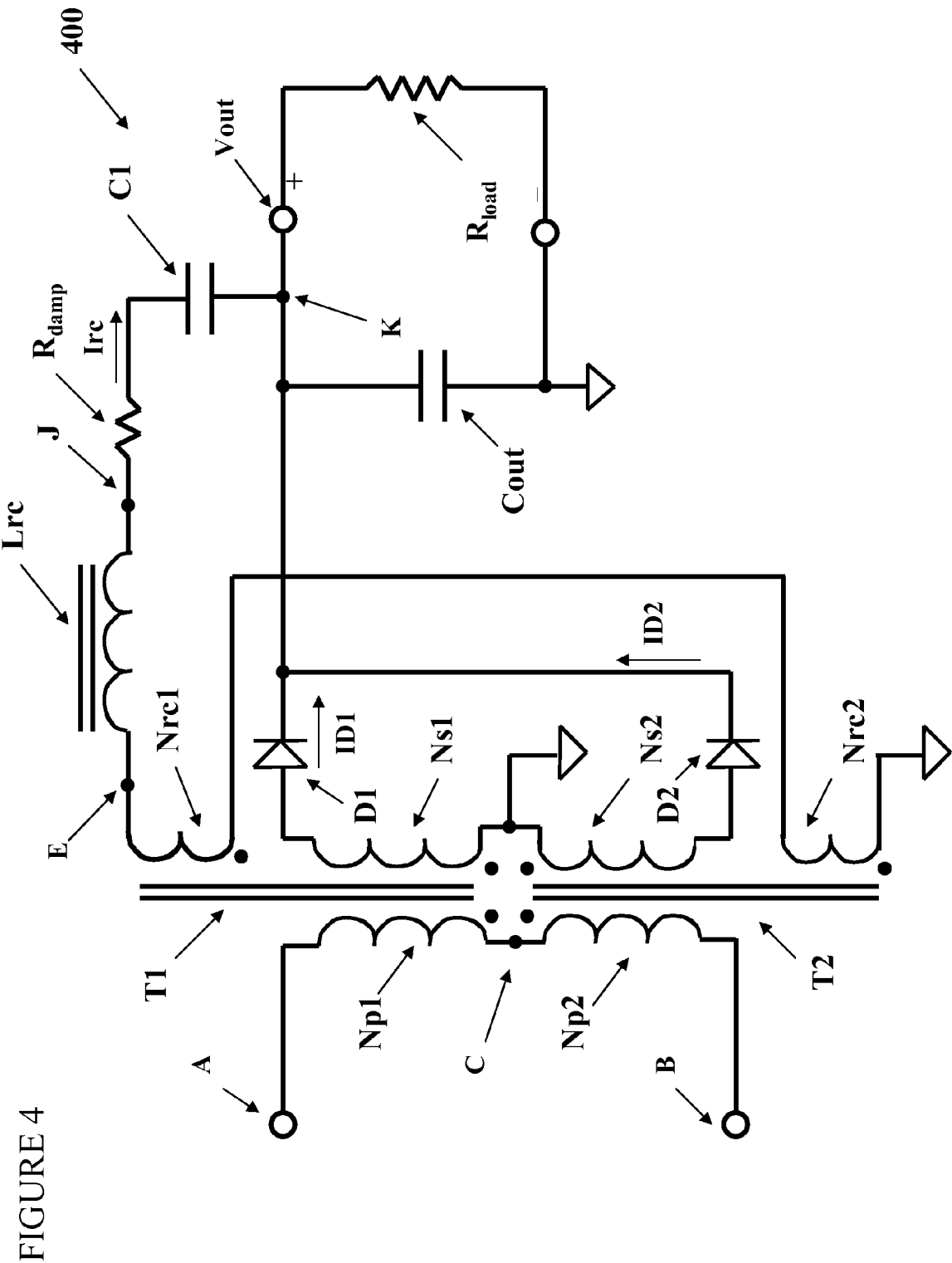
FIG. 4 illustrates a simplified schematic diagram of an embodiment of a current-doubler rectification circuit utilizing two transformers, constructed according to the principles of the invention.

Further exemplary inverter circuits used in switch-mode power converters to produce a high-frequency waveform across terminals A and B as described hereinabove include, without limitation, a "half bridge," such as described in U.S. Pat. No. 6,188,586 by Farrington, et al., entitled "Asymmetrical Half-Bridge Power Converter Having Reduced Input Ripple and Method of Manufacturing the Same," and a "full bridge," such as described by Steigerwald, et al., in U.S. Pat. No. 4,864,479, entitled "Full-Bridge Lossless Switching Converter," and by Blair, et al., in U.S. Pat. No. 6,483,724, entitled "DC/DC ZVS Full Bridge Converter Power Supply Method and Apparatus," which references are incorporated herein by reference Turning now to FIG. 4, illustrated is a simplified schematic diagram of a current-doubler rectification circuit 400 utilizing transformers T1 and T2, constructed according to the principles of the invention. The circuit is powered by a high-frequency ac voltage source via input nodes A and B, for example, a high-frequency ac voltage source such as produced, without limitation, by an inverter circuit such as illustrated and described hereinabove with reference to FIG. 3. The circuit advantageously produces an output voltage Vout with minimal output ripple components over a range of operating conditions, such as a range of duty cycle, load current, load voltage, and switching frequency.

The ripple-reducing properties of current-doubler rectification circuit 400 advantageously may allow reduction of component values of other reactive circuit elements in a switch-mode inverter, for example, the clamp capacitor in an active clamp topology. Reducing component values of reactive circuit elements is often advantageous in the design of a controller for a power converter, and in the response time of the converter to changes in input or output operating conditions.

Transformers T1 and T2 include primary windings Np1 and Np2, respectively, coupled in series, and secondary windings Ns1 and Ns2, respectively, also coupled in series, with winding senses as illustrated in FIG. 4 using the "dot" convention for transformer windings. For a desired output voltage, the ratio of the number of turns of the transformer secondary winding to the number of turns in the transformer primary winding is generally selected to provide an acceptable duty cycle range for an expected range of the input voltage waveform coupled across nodes A and B.

The common node of the transformer primary windings is node C, that is a "floating" node, i.e., its voltage is preferably unconstrained by a circuit component coupled thereto, such as a capacitor. In an alternative embodiment, a damping filter such as a resistor-capacitor ("R-C") filter may be coupled to node C to attenuate a high-frequency ringing voltage that may be produced in a particular circuit implementation. Each secondary winding provides a current path for output current. The common node of the secondary windings is coupled to local circuit ground. The secondary windings are coupled to rectifying diodes D1 and D2, that are coupled together at node K, that is coupled to an output node of the circuit to produce output voltage Vout. Rectifying diodes D1 and D2 each respectively carries current ID1 and ID2. The output voltage Vout is filtered by output capacitor Cout coupled across output terminals of the circuit. In a preferred embodiment, without limitation, the rectification circuit 400 advantageously does not include an output inductor either between the common node of the diodes D1 and D2 and an output terminal, or between an output terminal and the common grounded node of the transformer secondary windings. The capacitor Cout is thus selectively coupled to a transformer secondary winding as determined by diode D1 and/or D2 that is forward biased. Omission of the output inductor advantageously removes a circuit component that may exhibit significant power dissipation because such inductor would ordinarily carry the full output current. In a particular circuit implementation, a small inductor-capacitor ("L-C") output filter may be provided, nonetheless, in series with an output terminal to attenuate remaining high-frequency current components.

The transformers T1 and T2 each respectively includes ripple-cancellation windings Nrc1 and Nrc2 that are coupled in series with the winding senses indicated by the dots to produce a voltage at node E that is a measure of a difference of voltages applied to transformers T1 and T2. When the slope of an increasing current in one transformer matches the slope of a decreasing current in the other transformer, advantageously no net voltage is produced by the ripple-cancellation windings Nrc1 and Nrc2. A ripple-cancellation inductor Lrc is coupled in series with windings Nrc1 and Nrc2 and capacitor C1, and injects a ripple-cancellation current into node K to cancel substantially an ac current produced therein by the rectification action of transformers T1 and T2 and diodes D1 and D2. Ripple-cancellation inductor Lrc, in an advantageous embodiment, is sized as described hereinbelow in view of the number of turns of the several transformer windings. In an advantageous embodiment, capacitor C1 is sized sufficiently large so that accurate injection of a ripple-cancellation current into node K by ripple-cancellation inductor Lrc is not compromised.

In an advantageous embodiment, capacitors C1 and Cout are sized to achieve a level of remaining ripple voltage produced across capacitor Cout. In an advantageous embodiment, the inductance-capacitance time constant $2\pi \cdot (Lrc \cdot C1)^{0.5}$ is greater than a switching period $1/f_s$ of the power converter. Ideally, resistance of the ripple-cancellation circuit including ripple-cancellation inductor Lrc is as low as possible to preserve the accuracy with which ripple-cancellation current is injected into node K, which is a preferred circuit arrangement. Nonetheless, in some applications, a damping resistor $R_{damp}$ may be employed in series with the circuit which includes transformer windings Nrc1 and Nrc2 to damp a high-frequency resonant ringing current. The damping resistor $R_{damp}$ includes the effective series resistance (ESR) of the capacitor C1.

During ordinary operation of the circuit illustrated in FIG. 4, during a first portion of a switching cycle of the power converter when node A is sufficiently positive with respect to node B, a voltage is produced across transformer winding Ns1 in the direction that causes diode D1 to conduct, causing a current ID1 to be injected into node K. Since output capacitor Cout substantially clamps the voltage across node K, a corresponding voltage (with consideration of the small forward-conduction voltage drop of diode D1) is produced across transformer primary winding Np1, that establishes a voltage at floating node C dependent on the voltage at node A. The voltage across transformer primary winding Np2 is the difference between the voltages applied to nodes A and B and the voltage produced across transformer winding Np1. Similarly, during a second portion of a switching cycle when node B is sufficiently positive with respect to node A, a voltage is produced across transformer winding Ns2 in the direction to cause diode D2 to conduct, causing a current ID2 to be injected into node K. In general, currents injected by the circuit into node K during first and second portions of a switching cycle are neither equal nor constant unless a particular design operating point prevails for the voltage waveform applied across nodes A and B, and unless the applied waveform is rectangular. Further circuit constraints should also be met as described later hereinbelow.

During the first portion of a switching cycle when node A is sufficiently positive with respect to node B, diode D2 is back biased, conducting no current. As a consequence, no current flows in secondary winding Ns2 of transformer T2. The current flowing into transformer winding Np2 conceptually flows through the magnetizing inductance (referenced to the primary winding Np2) of transformer T2, plus a ripple-cancellation current flowing in winding Nrc2 referenced to the primary winding of transformer T2. The current flowing through diode D1 is the sum of current flowing through the magnetizing inductance of transformer T2, plus current flowing through the magnetizing inductance of transformer T1, both currents referenced to magnetizing inductances on the primary sides of transformers T1 and T2, plus a ripple-cancellation current flowing in windings Nrc1 and Nrc2 referenced to the secondary winding of transformer T1.

If a rectangular waveform is coupled across nodes A and B with a certain duty cycle D, and if the magnetizing inductances of transformers T1 and T2 are selected as described further hereinbelow, then the magnetizing current in one transformer increases at the same rate that the magnetizing current in the other transformer decreases. Ideally, the equal but opposite rates of change of currents in magnetizing currents produce a constant current in node K, either from diode D1 or D2. Thus, no substantial ripple current flowing into node K is produced, and no current need be injected by the ripple-cancellation circuit.

For a different waveform coupled across nodes A and B, e.g., for a different duty cycle, then the magnetizing current in one transformer increases at a rate different from the rate at which the magnetizing current in the other transformer decreases. The unequal (and oppositely signed) rates of change of these magnetizing currents produce a time-varying current in node K.

To design a current-doubler rectification circuit that creates minimal output ripple current for a rectangular waveform applied to nodes A and B, and without a mirroring injected ripple-canceling current, two conditions should be satisfied. One condition requires the primary-to-secondary turns ratio of the two transformers to be equal to avoid step discontinuities in output current at transitions from one duty cycle portion D to the complementary portion 1-D, as indicated by equation (1):

$$\frac{Np1}{Ns1} = \frac{Np2}{Ns2}.$$

When the turns ratios are equal, output voltage is given by equation (2):

$$Vout = V_D \cdot D \cdot \left(\frac{Ns1}{Np1}\right),$$

where $V_D$ is the voltage applied between nodes A and B during the "D" portion of the duty cycle, i.e., when node A is positive with respect to node B. The voltage $V_{1-D}$ is applied during the "1-D" portion of the duty cycle, i.e., when node B is positive with respect to node A, and $$V_{1-D} = -V_D \cdot \frac{D}{1-D}.$$

A second ripple-cancellation condition that should be satisfied, even without a mirroring injected ripple current, is that the ratio of the transformer magnetizing inductances referenced to their primary windings be proportioned according to the ratio of duty cycle D as indicated by equation (3):

$$\frac{Lmag1}{Lmag2} = \frac{D}{1-D}.$$

The second condition provides slopes of currents in magnetizing inductances that are summed to form the output current that are equal but opposite in sign, resulting in zero slope for their sum. When both of these conditions are satisfied, there is minimal generation of ripple current in the output of a practical circuit at a predetermined duty cycle D.

In a practical circuit, a small, residual ripple current remains due to variation in duty cycle D and ordinary circuit non-idealities. The residual ripple current can be cancelled by a circuit constructed according to the principles of the invention by sensing a scaled voltage difference between windings in transformers T1 and T2, and integrating the voltage difference with a ripple-cancellation inductor Lrc. The circuit is illustrated in FIG. 4, comprising sense windings Nrc1, Nrc2 coupled in series in the sense illustrated. Inductor Lrc does not conduct a dc portion of the output current, which is blocked by capacitor C1.

The turns ratios of ripple-cancellation windings Nrc1 and Nrc2 are dependent on the magnetizing inductances as given by equation (4):

$$\frac{Nrc1}{Nrc2} = \left(\frac{Ns1}{Ns2}\right) \cdot \left(\frac{Lmag2}{Lmag1}\right).$$

The inductance for ripple-cancellation inductor Lrc is given by equation (5):

$$Lrc = (Lmag1) \cdot \left(\frac{Ns1 \cdot Nrc1}{(Np1)^2}\right) \cdot \left(1 - \frac{Nrc1}{Ns1} - \frac{Nrc2}{Ns2}\right).$$

The resulting current injected by inductor Lrc cancels, advantageously by 20-30 dB or more in a practical circuit, remaining ripple current that escapes the ripple canceling constraints imposed by equations (1) and (3) on transformers T1 and T2.

The number of turns in secondary windings Ns1 and Ns2 should be high in comparison to the number of turns in windings Nrc1 and Nrc2, e.g., the ratio should be about 4:1 or more, but preferably not substantially more. A small number of turns in windings Nrc1 and Nrc2 produces only small reflected currents in the primary windings of the transformers T1 and T2, thereby causing minimal effect in other portions of the circuit.

In an exemplary embodiment, the component values illustrated in Table I below provide substantial ripple cancellation for the circuit illustrated in FIG. 4. The switching frequency is 250 kHz.

TABLE I

| | |
|---|---|
| Magnetizing inductance of transformer T1(ref. primary) | 6 μH |
| Magnetizing inductance of transformer T2(ref. primary) | 2 μH |
| Np1:Ns1:Nrc1 | 10:10:1 |
| Np2:Ns2:Nrc2 | 10:10:3 |
| Lrc | 0.36 μH |
| C1 | 10 μF |
| Cout | 0.1 μF |

The node J illustrated in FIG. 4 and in other figures is described later hereinbelow with reference to FIG. 14.

Figure 5:
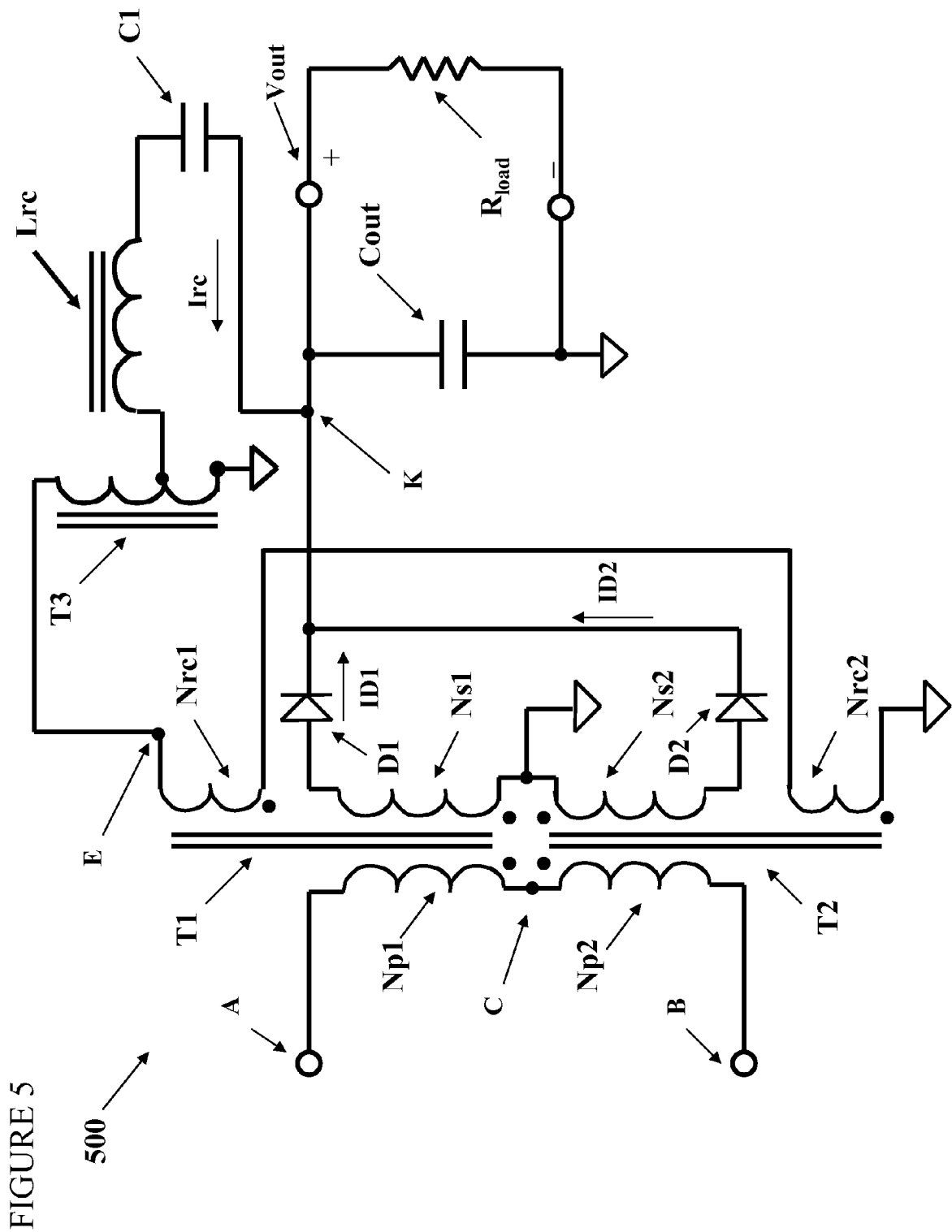
FIGS. 5 and 6 illustrate a simplified schematic diagram of further embodiments of a current-doubler rectification circuit utilizing two transformers, constructed according to the principles of the invention.
Figure 6:
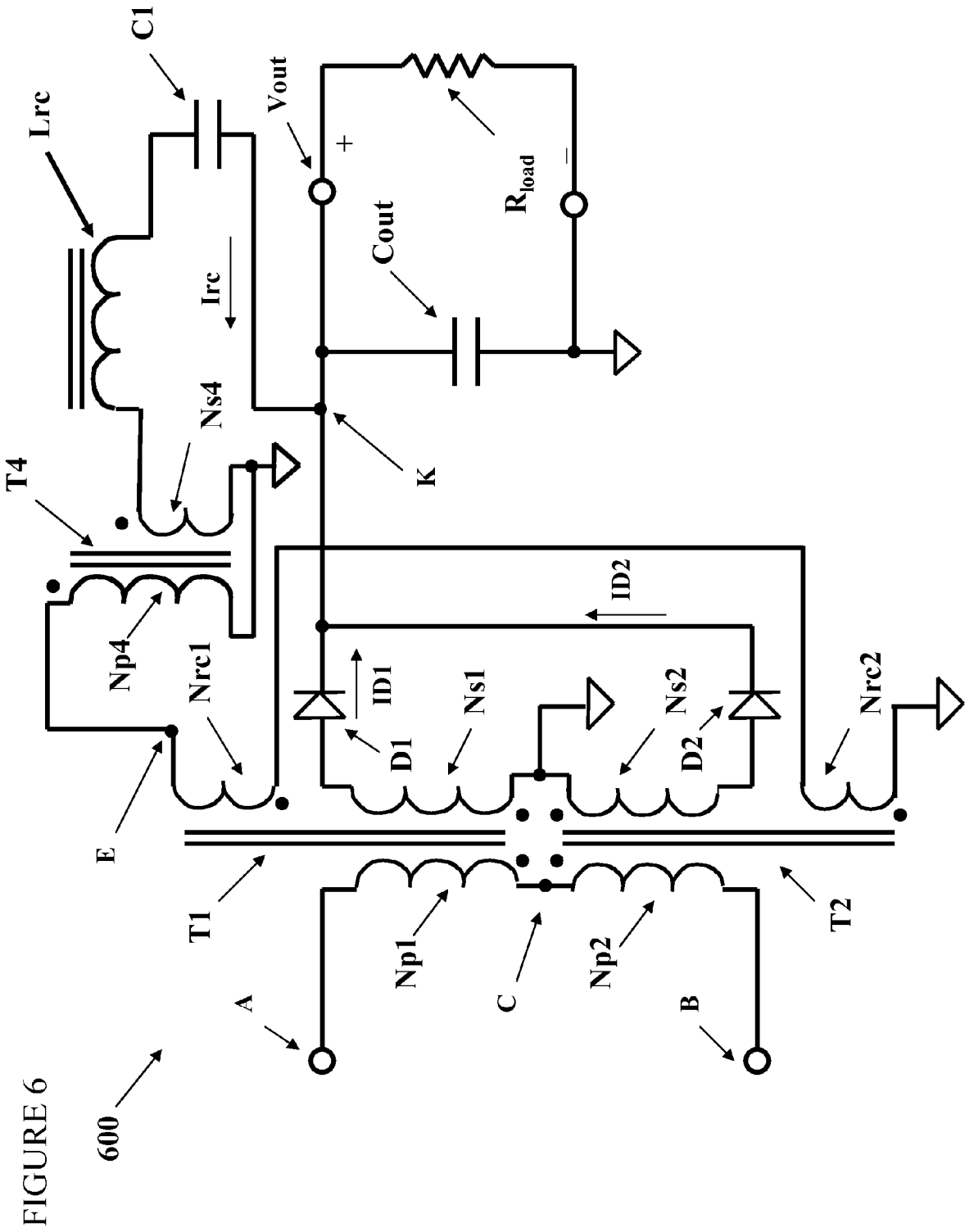

Turning now to FIG. 5, illustrated is a simplified schematic diagram of a further embodiment of a current-doubler rectification circuit 500, constructed according to the principles of the invention. The circuit illustrated in FIG. 5 includes autotransformer T3 that provides a voltage coupled to ripple-cancellation inductor Lrc that can be adjusted with better precision by the location of the winding tap than can be provided just with the integral number of turns required by the design of ordinary transformers such as transformers T1 and T2. A transformer for low-voltage applications may have only one-turn secondary windings Ns1 and Ns2, thereby interfering with options for selecting a suitably small number of turns in ripple-cancellation windings Nrc1 and Nrc2. By including autotransformer T3, a substantial portion of the limited turns-ratio adjustment ability illustrated in FIG. 4 is thereby relieved. In a further embodiment, autotransformer T3 is replaced with an ordinary two-winding transformer T4 with primary and secondary windings Np4 and Ns4, respectively, as illustrated in FIG. 6.

Figure 7:
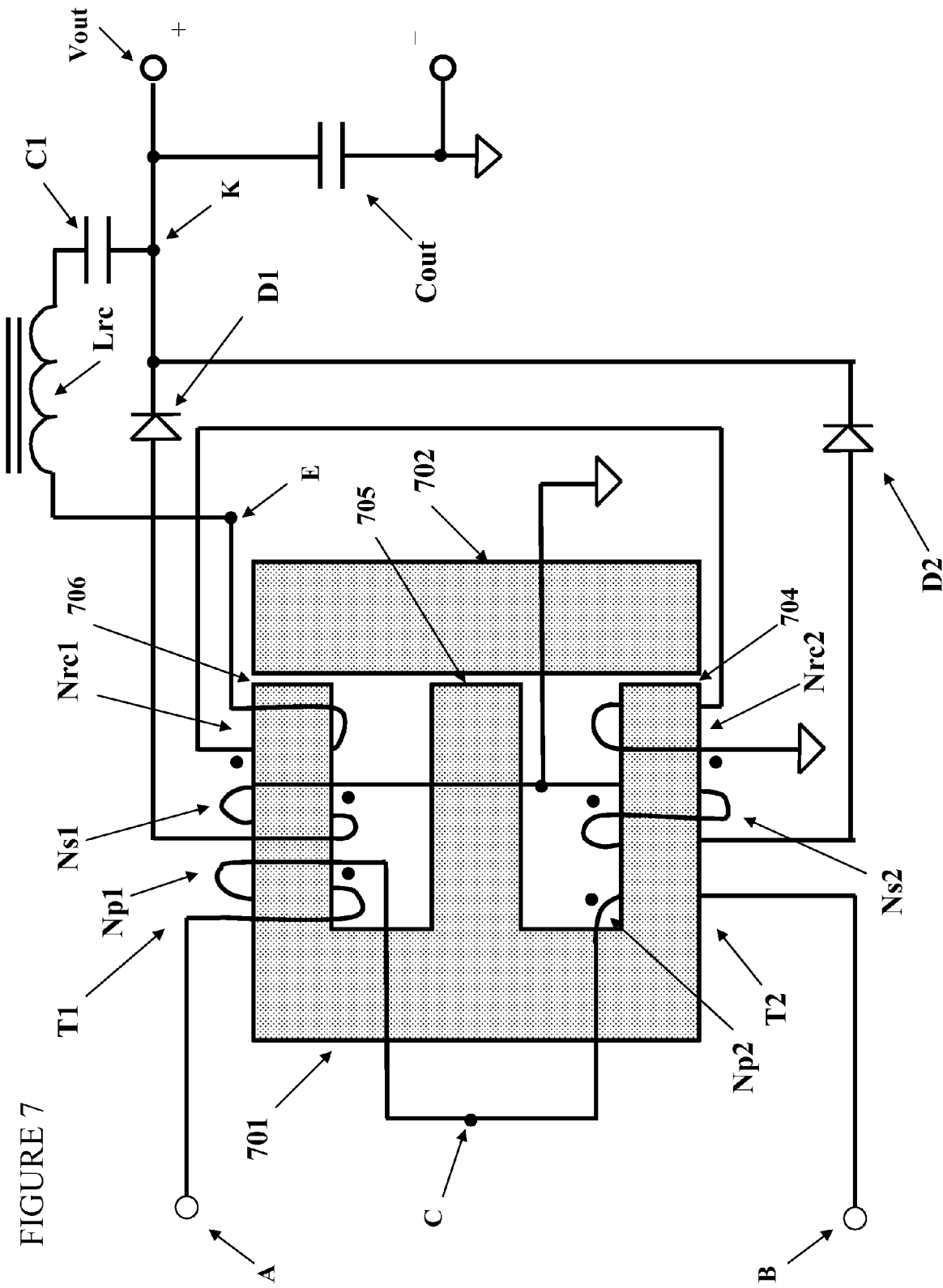
FIGS. 7 and 8 illustrate a diagram of integrated magnetics structures combining a plurality of transformers, in further embodiments of a current-doubler rectification circuit, constructed according to the principles of the invention.

Turning now to FIG. 7, illustrated is an integrated magnetics structure combining transformers T1 and T2, as described hereinabove with reference to FIGS. 4, 5, and 6, in a further embodiment of a current-doubler rectification circuit of the invention. Combining a plurality of transformers into a single magnetics structure is, per se, well known in the art. For example, P. Xu, et al., in the paper entitled "A Novel Integrated Current Doubler Rectifier," IEEE Applied Power Electronics Conference, Feb. 6, 2000, pp. 735-740, and J. Sun, et al., in the paper entitled "Integrated Magnetics for Current-Doubler Rectifiers," IEEE Transactions On Power Electronics, Volume 19, No. 3, May 2004, pp. 582-590, provide exemplary descriptions of integration of two power transformers into a single magnetics structure. These papers are incorporated herein by reference.

The magnetics structure illustrated in FIG. 7 includes transformer T1 windings Np1, Ns1, Nrc1 and transformer T2 windings Np2, Ns2, Nrc2, wound on legs of exemplary E-I core structure 701, 702. Air gaps 704, 705, and 706, which are not necessarily of equal length, and which may include substantially nonmagnetic and nonconductive materials such as plastic, provide means well understood in the art to control saturation of the magnetic core pieces as well as magnetic coupling between windings of transformers T1 and T2. In a preferred embodiment, the length of air gap 705 is longer than the length of air gaps 704 and 706. By winding the turns of each winding in the senses indicated in FIG. 7, a time-varying magnetic field in the center leg of the core structure is reduced, thereby substantially reducing heat generation in this portion of the magnetics structure, as well as accommodating reduced cross-sectional area for the center leg of the core. A load, which is ordinarily coupled across output capacitor Cout, is not illustrated in this figure, or in FIG. 8 as described below.

Figure 8:
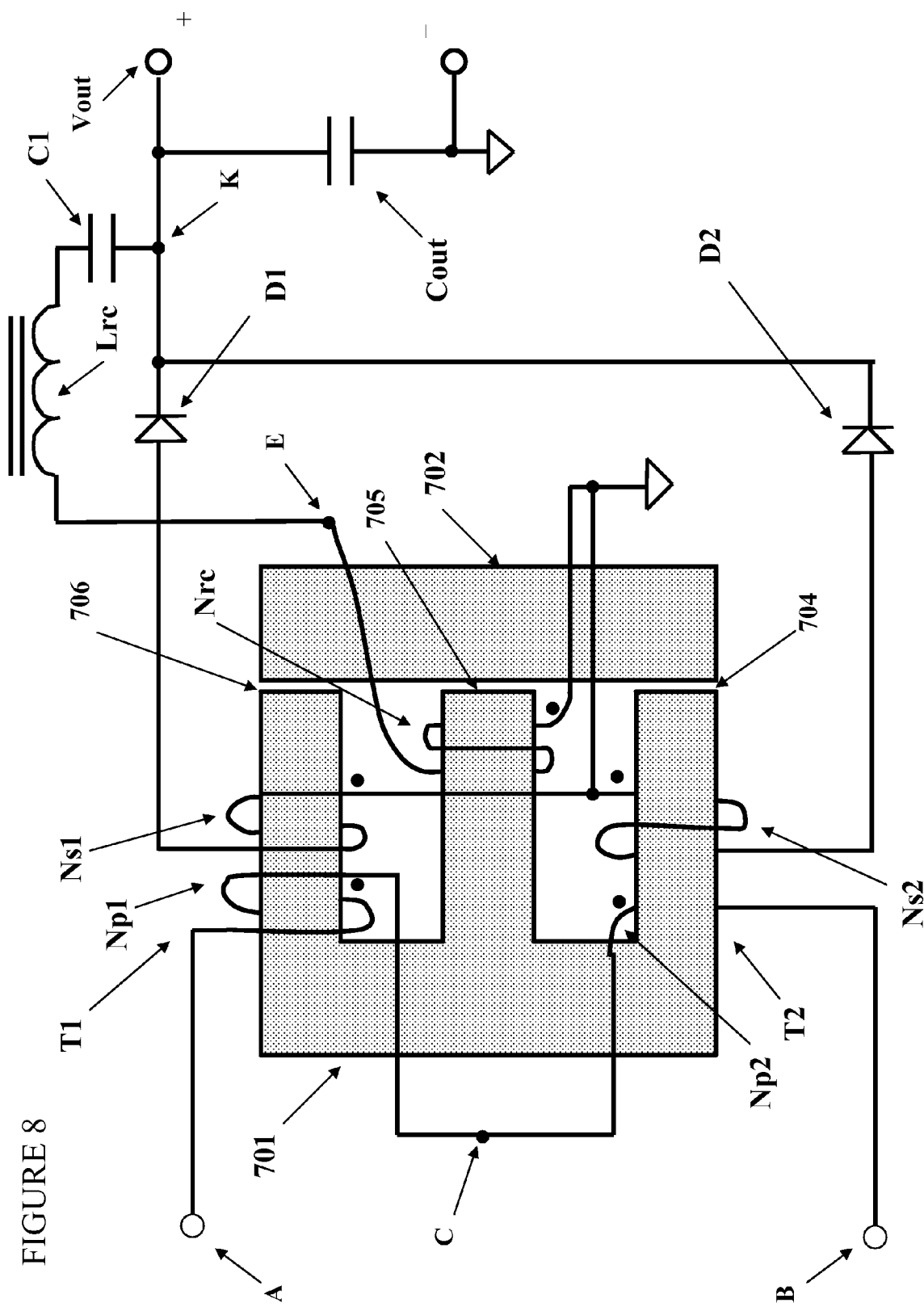

Turning now to FIG. 8, illustrated is a further integrated magnetics structure combining the transformers T1 and T2 as described hereinabove with reference to FIGS. 4, 5, and 6, of a preferred embodiment of a current-doubler rectification circuit of the invention. In this embodiment, a ripple-cancellation winding is wound around a common leg of the core structure, i.e., the center leg as illustrated in the figure. In the embodiment described with reference to FIG. 7, the ripple-cancellation windings Nrc1 and Nrc2 sense a difference in flux between the outer legs of the magnetic core structure to sense a voltage difference. Since the common leg in the structure illustrated in FIG. 8 carries magnetic fluxes from the outer legs flowing in opposite directions, a single sense winding Nrc can be used to sense a flux difference in a common leg to sense a voltage difference. It is noted that the winding Nrc does not carry a dc component of load current. It is noted further that sense winding Nrc, that performs the function of the two windings Nrc1 and Nrc2 illustrated in FIG. 7 by encircling two independent flux components from the outer core legs, should be designed to represent equal number of turns in windings Nrc1 and Nrc2.

Figure 9:
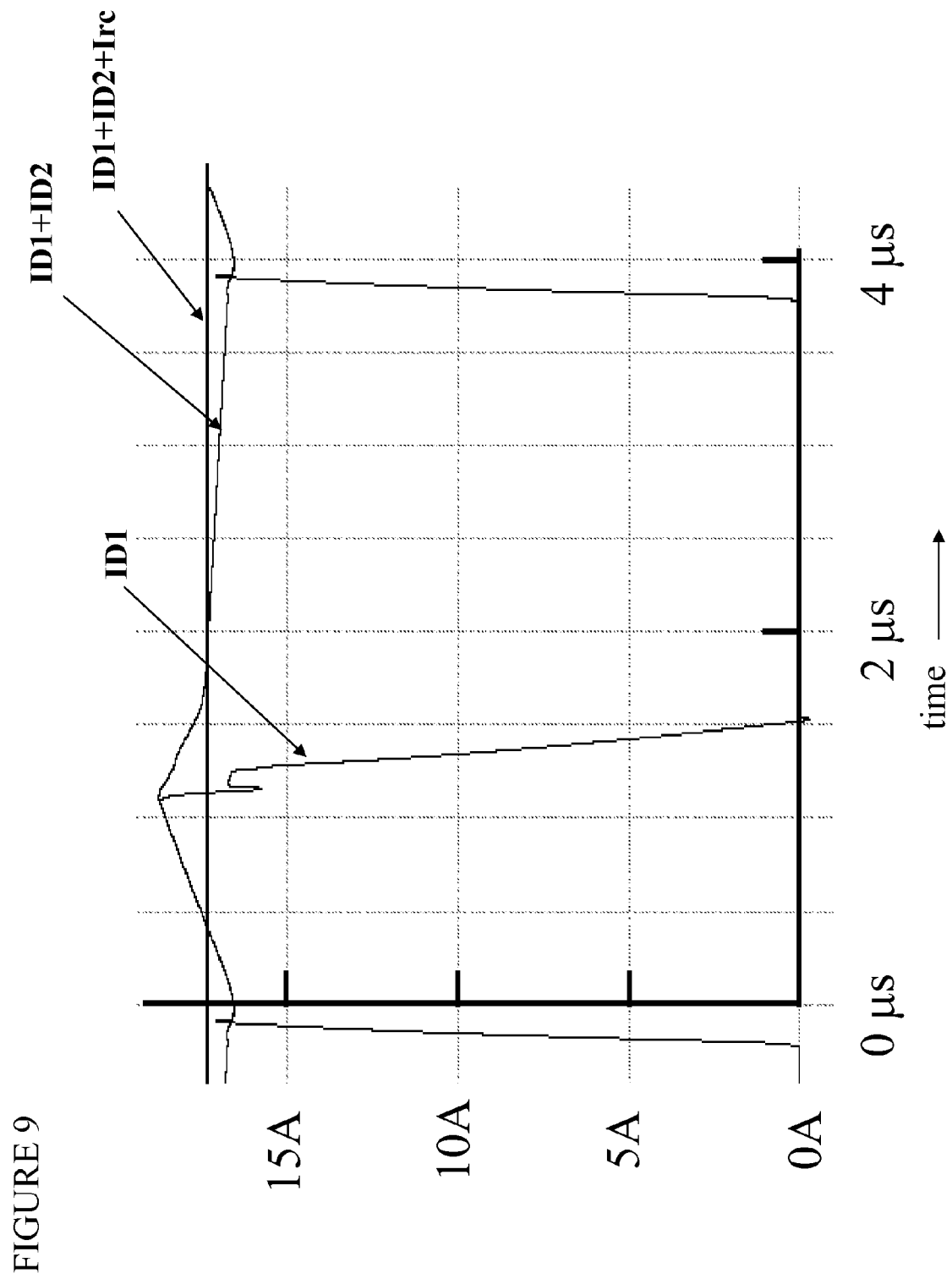
FIG. 9 illustrates a graphical representation of currents produced by simulation of a current-doubler rectification circuit, constructed according to the principles of the invention.

Turning now to FIG. 9, illustrated is a graphical representation of currents produced by a PSpice™ simulation of the active clamp inverter illustrated in FIG. 3 coupled to the current-doubler rectification circuit illustrated in FIG. 4, using component values illustrated in Table I for the current-doubler rectification circuit. The active clamp inverter was simulated for a switching frequency of 250 kHz. The results shown in FIG. 9 are for a duty cycle D of roughly 0.375. The roughly rectangular current waveform ID1 represented in FIG. 6 flowing through diode D1 is shown in FIG. 9. The sum of the roughly rectangular current waveform ID1 plus the roughly rectangular current waveform ID2 is also shown in FIG. 9 as the roughly triangular waveform ID1+ID2. The summed current ID1+ID2 flows into capacitor Cout, inducing thereby a modest ripple voltage across this capacitor. Adding the ripple-cancellation current Irc (illustrated in FIG. 4) produces the substantially time-invariant current ID1+ID2+Irc illustrated in FIG. 9, demonstrating a high level of ripple cancellation. Repeated simulations in which the switching frequency, duty cycle, output voltage, and load current were altered produced the same result: a high level of cancellation of ripple currents flowing into capacitor Cout without need for circuit adjustment as any of these parameters was varied.

Figure 10:
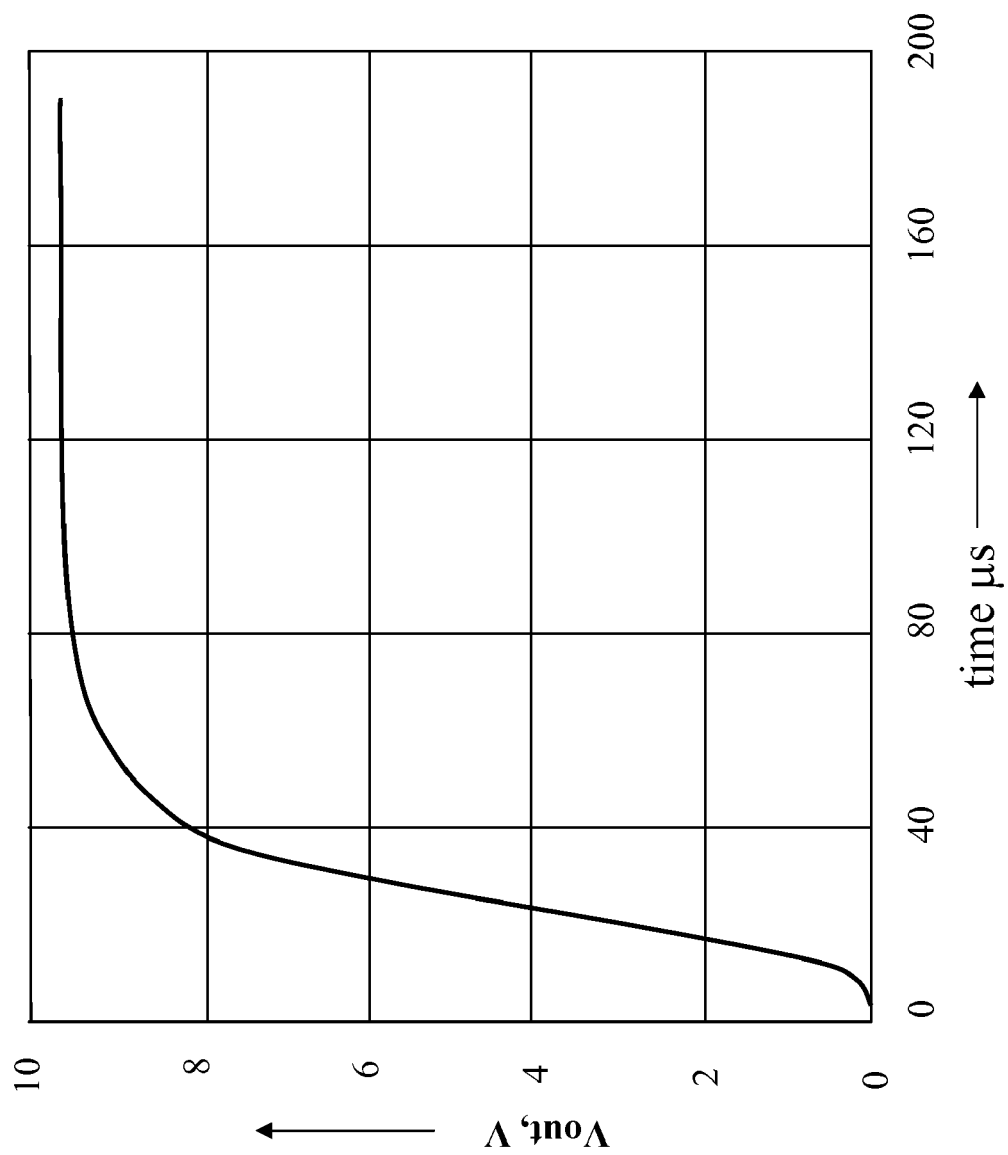
FIG. 10 illustrates a graphical representation produced by simulation of output voltage after a "cold start" of a power converter including a current-doubler rectification circuit, constructed according to the principles of the invention.

Turning now to FIG. 10, illustrated is a graphical representation of the output voltage Vout for a "cold start" of the circuit at an initial time point, produced by simulation, demonstrating a very low level of output ripple voltage with a modest output capacitor of only 0.1 μF.

Figure 11:
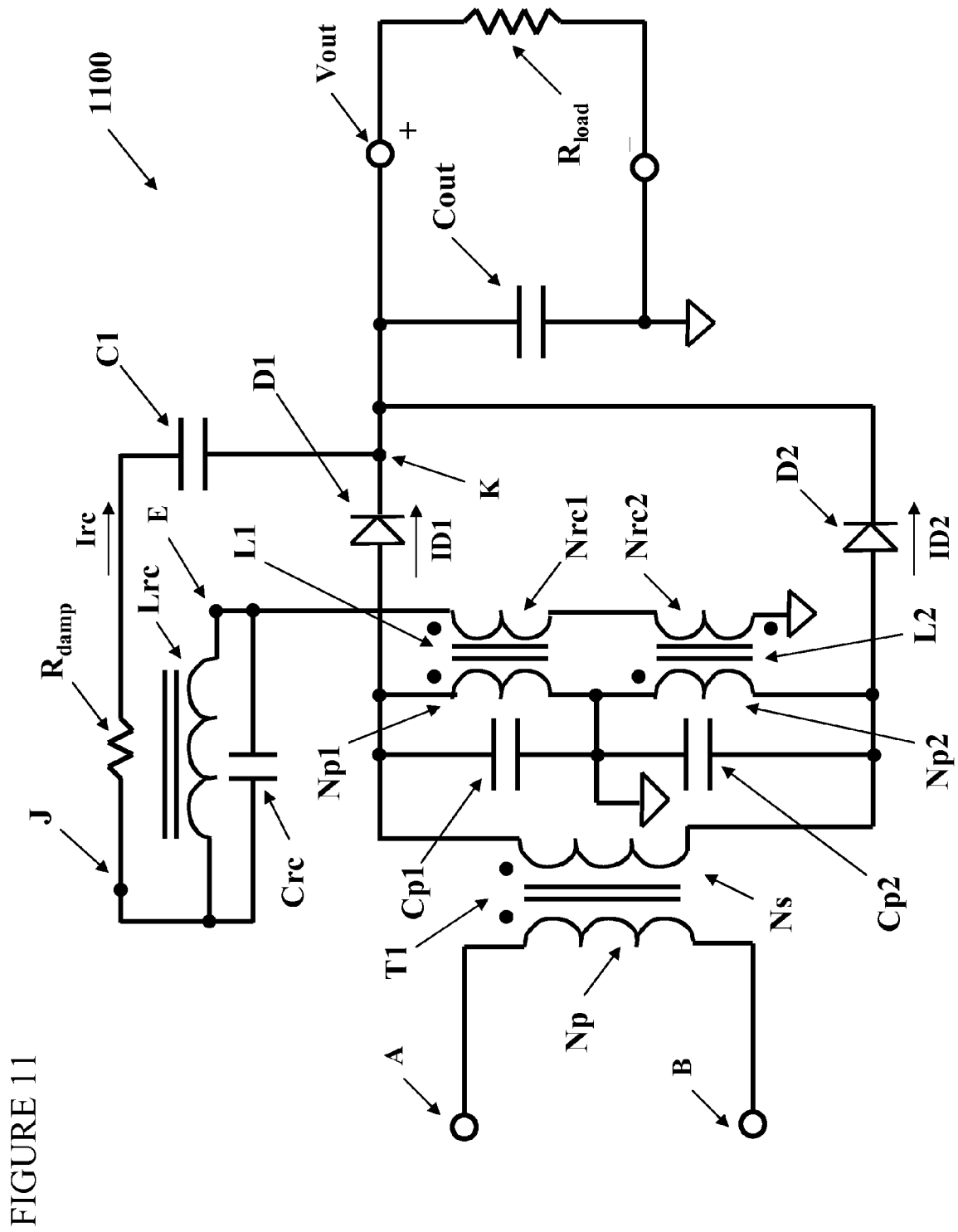
FIG. 11 illustrates a simplified schematic diagram of a further embodiment of a current-doubler rectification circuit, constructed according to the principles of the invention.

Turning now to FIG. 11, illustrated in a further embodiment of the invention is a simplified schematic diagram of a current-doubler rectification circuit 1100. The current-doubler rectification circuit 1100 includes two inductors coupled in series across secondary winding Ns of transformer T1. The circuit illustrated in FIG. 11 can be coupled to a high-frequency ac voltage source via input nodes A and B, constructed as described hereinabove, and may even omit the transformer. The current-doubler rectification circuit 1100 includes ripple-cancellation windings Nrc1, Nrc2 configured to sense a scaled voltage difference, i.e., scaled by a turns ratio, between inductors L1 and L2. Ripple-cancellation windings Nrc1, Nrc2 are coupled to ripple-cancellation inductor Lrc to generate an accurate ripple-cancellation current, advantageously over a range of duty cycle, load current, load voltage, switching frequency, delays between conduction intervals of power switches, and further non-idealities of a practical circuit such as forward and reverse recovery of diodes. The circuit is operable with numerous power conversion topologies such as symmetric and asymmetric half bridges, full bridges, resonant and quasi-resonant topologies, etc.

Transformer T1 includes primary winding Np and secondary winding Ns. The ratio of the number of turns in the transformer primary winding to the number of turns in the transformer secondary winding is selected to provide an acceptable range of duty cycle to accommodate an expected range of input voltage waveforms coupled across nodes A and B, using design techniques well known in the art.

The current-doubler rectification circuit 1100 includes inductors L1 and L2 with primary windings Np1, Np2 coupled in series across terminals of transformer secondary winding Ns. Each inductor, i.e., primary windings Np1 and Np2, provides a current path for output current. A node coupled to a common terminal of inductors L1 and L2 is coupled to local circuit ground. The secondary winding of transformer T1 is also coupled to rectifying diodes D1 and D2, which are coupled together at node K, which is coupled to an output node of the circuit to produce output voltage Vout. Rectifying diodes D1 and D2 each respectively carries current ID1 and ID2. Output voltage Vout is filtered by output capacitor Cout coupled across output terminals of the circuit. Output capacitor Cout is thus selectively coupled to a terminal of transformer secondary winding Ns as determined by forward biasing of diode D1 and/or D2.

Inductors L1 and L2 each respectively includes ripple-cancellation secondary windings Nrc1 and Nrc2 that are coupled in series with the winding senses indicated in the figure by the dots to produce a voltage at node E, that is a measure of a scaled difference of voltages applied to the primary windings of inductors L1 and L2. When the slope of an increasing current in one of the inductors matches the slope of a decreasing current in the other inductor, advantageously no net voltage is produced by the ripple-cancellation windings Nrc1 and Nrc2. Ripple-cancellation inductor Lrc is coupled in series with capacitor C1 and to node E. The ripple-cancellation circuit comprising inductor windings Nrc1 and Nrc2, ripple-cancellation inductor Lrc, and blocking capacitor C1 advantageously injects a ripple-cancellation current into node K to cancel ac current components injected therein by the rectification action of transformer T1, inductors L1 and L2, and diodes D1 and D2. Ripple-cancellation inductor Lrc, in a preferred embodiment, is sized as described hereinbelow in view of inductances of inductors L1 and L2. In a preferred embodiment, capacitor C1 is sized sufficiently large so that the ability of ripple-cancellation inductor Lrc to inject an accurate ripple-cancellation current into node K is preserved. In a preferred embodiment, the inductance-capacitance time constant $2\pi \cdot (Lrc \cdot C1)^{0.5}$ is greater than the switching period $1/f_s$ of the power converter.

Ideally, the resistance of the ripple-cancellation circuit including windings Nrc1, Nrc2, inductor Lrc, and capacitor C1 is as low as practical. Substantial resistance such as an added damping resistor in this portion of the ripple-cancellation circuit can compromise the accuracy with which a ripple-cancellation current is injected into node K. The effect of such added resistance is to absorb a portion of the voltage produced across the windings Nrc1 and Nrc2, thereby compromising the accuracy with which a voltage difference is produced across inductor Lrc. Nonetheless, a damping resistor $R_{damp}$ may optionally be included in series with the ripple-cancellation circuit to reduce high-frequency resonant ringing as may be required for a particular application.

During operation of the circuit illustrated in FIG. 11, when node A is sufficiently positive with respect to node B, a voltage is produced across transformer winding Ns in the direction that causes diode D1 to conduct, causing current ID1 to flow into node K. Similarly, during a second portion of a switching cycle when node B is sufficiently positive with respect to node A, a voltage is produced across transformer winding Ns in the direction that causes diode D2 to conduct, causing current ID2 to flow into node K.

A current that flows into node K includes the sum of currents flowing through inductors L1 and L2. During a typical switching cycle, voltages across inductors L1 and L2 are of opposite sign, causing a current in one inductor to increase, and a current in the other to decrease. By scaling inductances of these two inductors in proportion to a characteristic of their respectively applied voltage waveforms, the increasing slope of current through one inductor can substantially match a decreasing slope of current flowing through the other. For a current-doubler rectification circuit coupled to an ac voltage source with a rectangular waveform at nodes A and B (e.g., an active clamp inverter) with a voltage $V_D$ for a duty cycle D and a voltage $V_{1-D}$ for a complimentary duty cycle 1-D, then the summed current in inductors L1 and L2 flowing into node K is substantially constant, i.e., it can be configured to contain only modest ripple components. To obtain a substantially constant current, inductances Lmag1 and Lmag2 should be proportioned according to equation (6):

$$\frac{Lmag1}{Lmag2} = \frac{D}{1-D}.$$

In a practical current-doubler rectification circuit utilizing two inductors coupled across a transformer secondary winding, the condition for ripple-free operation is thus satisfied at only a particular duty cycle D, and does not provide accommodation for practical circuit disturbances such as forward or reverse recovery of diodes D1 and D2, etc. Nonetheless, the current-doubler rectification circuit produces a relatively low level of output ripple current in view of the sizes of the inductors L1 and L2 and the output filter capacitor Cout. But the circuit still produces an output current that is not sufficiently ripple free for many applications in view of duty-cycle variations and ordinary circuit non-idealities.

To generate a compensating ripple current that can be injected into node K to cancel remaining ripple-current components, windings Nrc1 and Nrc2 sense a scaled voltage difference between inductors L1 and L2 to produce a ripple-cancellation current in inductor Lrc, that should be properly sized.

To sense the proper voltage difference between inductors L1 and L2, the number of turns in inductor windings NP1, NP2, Nrc 1, and Nrc2 should be proportioned according to equation (7):

$$\frac{Lmag1}{Lmag2} = \left(\frac{Np1}{Nrc1}\right) \cdot \left(\frac{Nrc2}{Np2}\right),$$

where Lmag1 and Lmag2 are inductances of inductors L1 and L2, respectively, referenced to their primary windings. Larger values are preferred for the turns ratios Np1/Nrc1 and Np2/Nrc2 so that relatively little current is induced in the inductor primary windings by the ripple cancellation circuit. Very large values for these turns ratios must be balanced from a practical perspective against the corresponding size of the blocking capacitor C1, which would grow if the turns ratios become too large. A practical value of primary-to-secondary turns ratio is about 4:1 or somewhat larger. Ripple-cancellation inductor Lrc should be sized according to equation (8):

$$Lrc = Lmag1 \cdot \left(\frac{Nrc1}{Np1}\right) \cdot \left(1 - \frac{Nrc1}{Np1} - \frac{Nrc2}{Np2}\right).$$

In a practical circuit utilizing a finite capacitance for capacitor C1, improved ripple cancellation can be obtained by increasing the inductance of inductor Lrc slightly from the value indicated by equation (8), and also slightly from the value indicated by equation (5) above.

The amount of recirculating power required to remove ac ripple components from node K is generally small in comparison to the real power provided to a load coupled to the output Vout. It is noted that dc load current does not flow through windings Nrc1 and Nrc2, or through inductor Lrc. It is noted further that the current-doubler rectification circuit does not just cancel a ripple current produced by an individual inductor. Rather, the circuit produces a ripple-cancellation current that mirrors a difference of currents produced in inductors that may already be sized and configured for a ripple-cancellation effect. Recognizing that ripple-current components flowing into node K are substantially canceled by the ripple-cancellation circuit, capacitor Cout advantageously need not be of substantial size to produce a low level of output ripple voltage.

In a practical circuit implementation, circuit elements such as inductors and capacitors inherently exhibit parasitic capacitance between conductors, such as between turns of a winding in a magnetic circuit element, that produce unintended current paths in the presence of high-frequency voltages. For example, as illustrated in FIG. 11, capacitors Cp1 and Cp2 represent parasitic capacitance associated with windings Np1 and Np2, respectively, of inductors L1 and L2. These parasitic capacitors shunt a portion of high-frequency currents that would otherwise flow through diodes D1 and D2, thereby introducing an error in the ripple-canceling injected current. This error in injected current can be corrected, however, by coupling capacitor Crc in parallel with the inductor Lrc to inject a further ripple-canceling current component. Assuming that inductors L1 and L2 have the same inductance, turns ratio, and parasitic capacitance, i.e., Cp1=Cp2, the capacitance of capacitor Crc should be as given by equation (9):

$$Crc = (Cp1) \cdot \left(\frac{Np1}{Nrc1}\right) \cdot \frac{1}{\left[1 - 2 \cdot \left(\frac{Nrc1}{Np1}\right)\right]}.$$

Inclusion of capacitor Crc can advantageously attenuate high-frequency current spikes that would otherwise be present at node K. Similarly, a capacitor can be coupled in parallel with the inductor Lrc illustrated and described with reference to FIGS. 4, 5, 6, 7, 8, 12, and 13 to reduce high-frequency ripple-current components introduced by a parasitic capacitance. Further circuit elements can be included in the ripple-cancellation circuit to accommodate other parasitic effects, within the broad scope of the invention.

Figure 12:
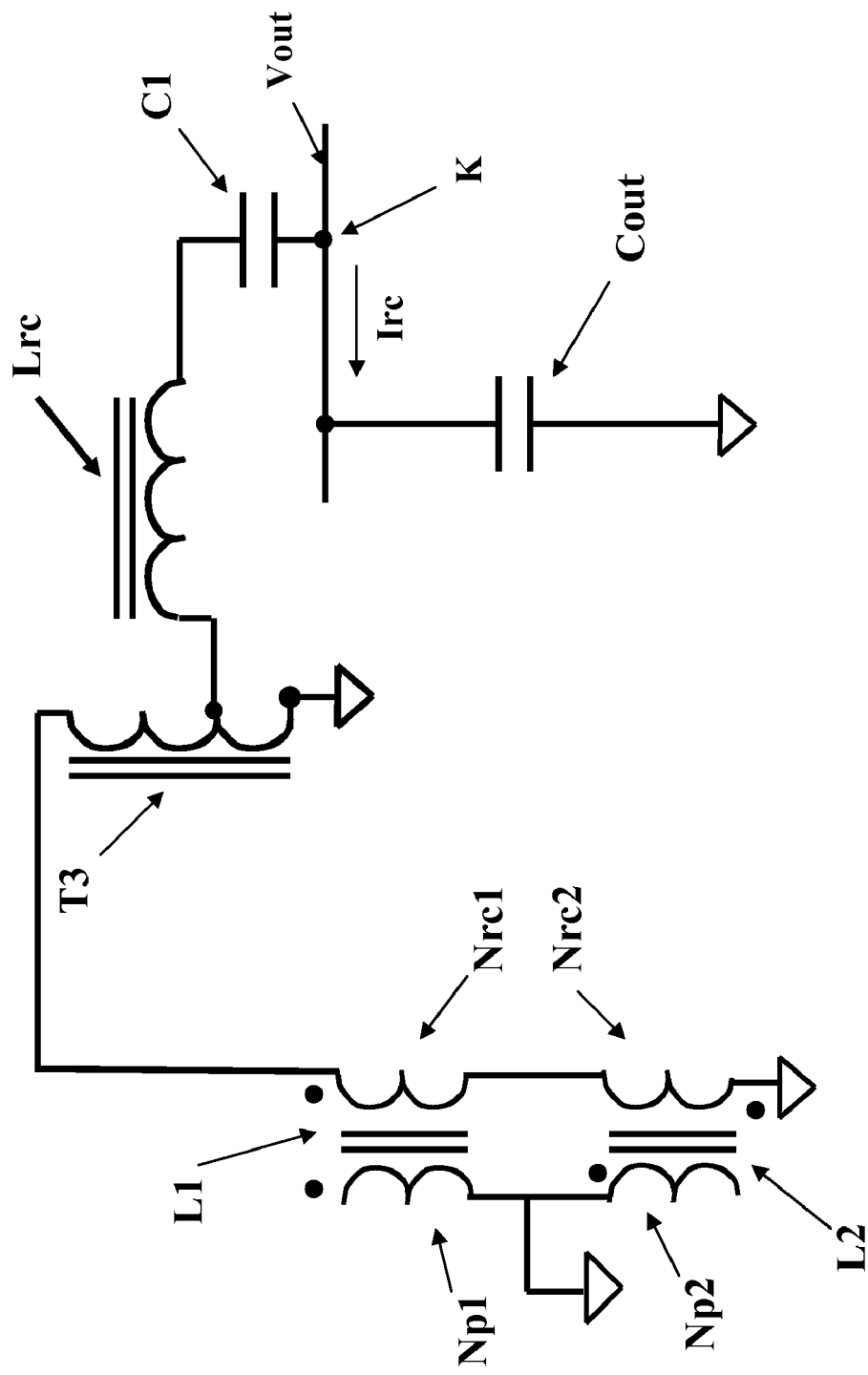
FIGS. 12 and 13 illustrate diagrams of circuit techniques that can be used to provide a fractional turn for transformer windings of a ripple-cancellation rectification circuit, constructed according to the principles of the invention.
Figure 13:
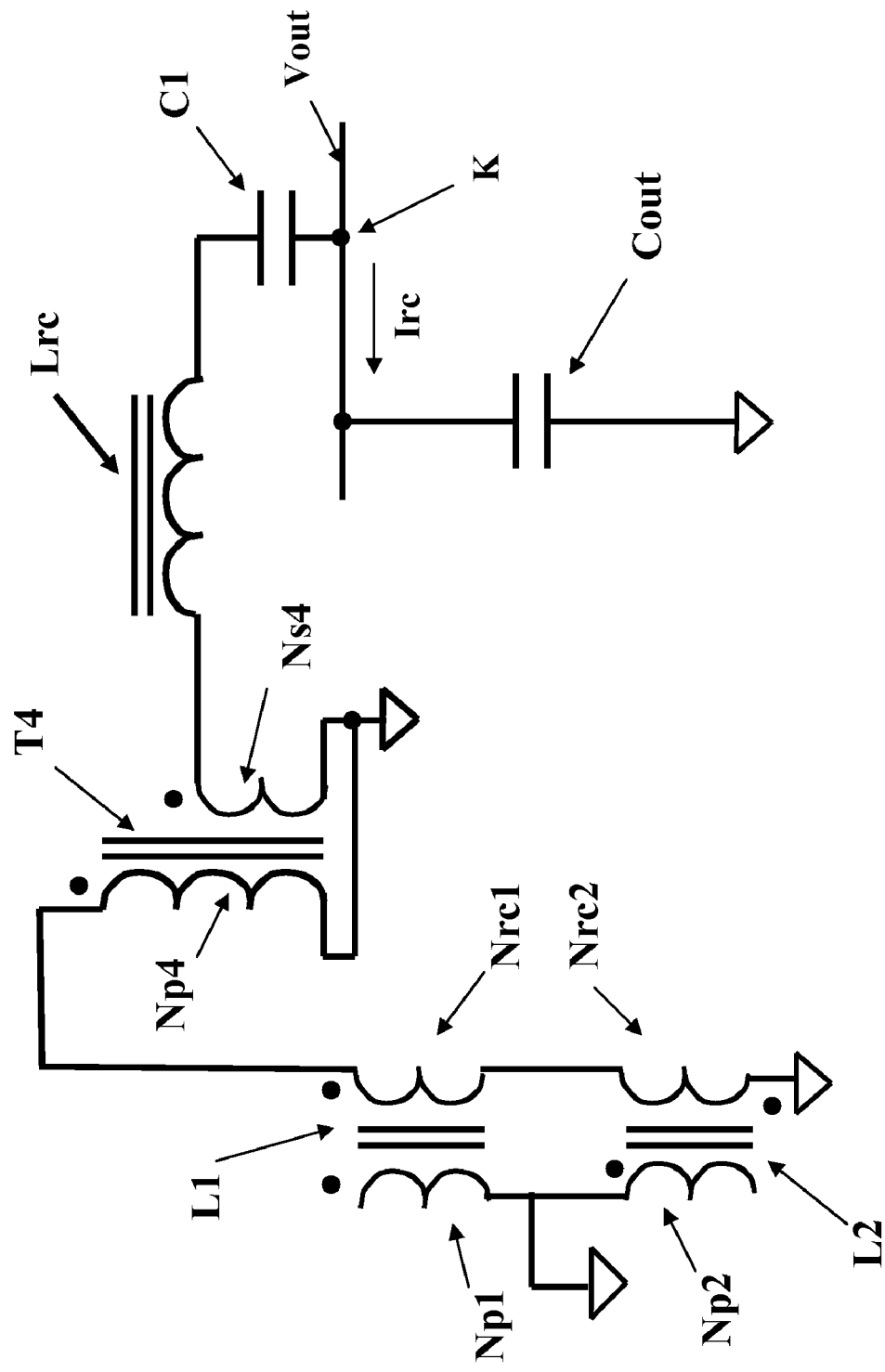

FIGS. 12 and 13 illustrate circuit modifications within the broad scope of the invention that can be applied to the ripple-cancellation rectification circuit illustrated in FIG. 11, wherein a tapped inductor T3 such as illustrated in FIG. 12, or a transformer T4, such as illustrated in FIG. 13 can be used to provide a fractional turn for windings Nrc1 and Nrc2.

An inductor Lrc can be produced with relatively accurate inductance, for example, and without limitation, by providing a well-dimensioned gap of sufficient thickness between core piece parts. An accurate inductor Lrc can also be constructed with a mechanical adjustment mechanism, such as a screw, to provide a value of inductance that can be accurately set, e.g., according to equation (8) above.

In an exemplary embodiment, the component values illustrated in Table II below provide ripple-reducing properties for the circuit illustrated in FIG. 11. The circuit was simulated using PSpice™ for a switching frequency of 250 kHz and a nominal duty cycle of 50%, and exhibited a highly reduced level of output ripple current.

TABLE II

| | |
|---|---|
| Inductance Lmag1 of inductor L1 | 10 µH |
| Inductance Lmag2 of inductor L2 | 5 µH |
| Np1:Nrc1 | 10:1 |
| Np2:Nrc2 | 5:1 |
| Lrc | 0.7 µH |
| C1 | 5 µF |
| Cout | 0.1 µF |

A value for the capacitor Crc is provided below in Table III in the discussion of FIG. 14.

Thus, the broad concept has been introduced of constructing a filter with two magnetic circuit elements to form two current paths conducting currents with roughly oppositely matched slopes. The two current paths are coupled together at a node. A scaled error voltage related to mismatching of the current slopes is sensed across the magnetic circuit elements. The scaled error voltage is coupled to an inductor and a series capacitor to produce a ripple-canceling current that is injected into a node of the filter.

A current-doubler rectification circuit has been described as an exemplary embodiment of the invention that can provide an output voltage Vout with multiple filtering processes that operate cooperatively to attenuate a ripple current in the output. The exemplary current-doubler rectification circuit utilizes three processes that operate in tandem employing a pair of magnetic circuit elements that provide two current paths for output (or input) current. The first process relies on the inductance of each magnetic circuit element, which requires a voltage to be applied thereto over a period of time to change a current flowing therein. The second is pairing of the two magnetic circuit elements so that an increasing slope of current in one substantially matches a decreasing slope of current in the other, and summing the two currents to produce a current with reduced ripple content. The third is to sense a scaled voltage difference between the magnetic circuit elements with oppositely sensing secondary windings, and inject a mirroring current derived therefrom that attenuates a remaining ripple in the summed current produced by the second process. The result is a current with a very low level of ripple. The circuit advantageously can operate over a range of duty cycles, load voltages, load currents, and switching frequencies without substantial generation of output ripple voltage.

The circuits described hereinabove that inject a ripple-cancellation current, e.g., into node K as illustrated in various figures herein, depend on sufficient capacitance in a blocking capacitor and low circuit resistance for accurate operation. Ideally, capacitor C1 is chosen with large capacitance and the circuit is formed with low resistance, particularly in the secondary portion of the circuit, e.g., secondary windings Nrc1 and Nrc2, inductor Lrc, and ESR of capacitor C1. Inductance of inductor Lrc should also be accurate, e.g., with a value as provided by equation (8). The need for a large blocking capacitor and low resistance advantageously can be relaxed with the addition of a supplementary ripple-cancellation circuit.

Figure 14:
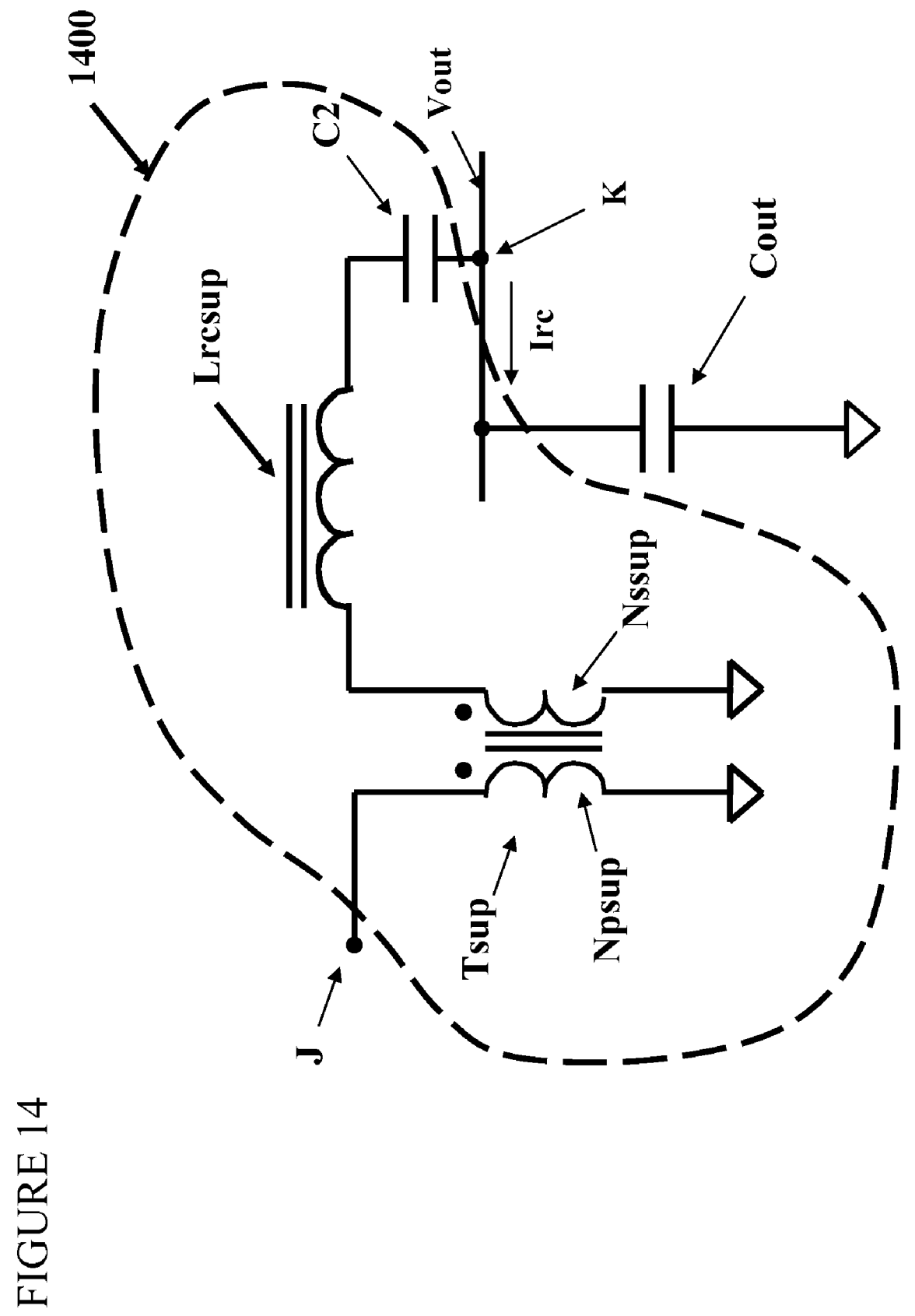
FIG. 14 illustrates a diagram of a ripple-cancellation circuit, constructed according to the principles of the invention.

Turning now to FIG. 14, illustrated is supplementary ripple-cancellation circuit 1400, constructed according to the principles of the invention, that accommodates a smaller blocking capacitor. Supplementary ripple-cancellation circuit 1400 is operable with a filter including at least two current paths to attenuate ripple components. Supplementary ripple-cancellation circuit 1400 includes transformer Tsup formed with primary winding Npsup coupled across one or more voltage sensing windings in series with a ripple-canceling inductor in a ripple-cancellation circuit, and a series arrangement of secondary winding Nssup, inductor Lrcsup, and blocking capacitor C2 that injects a supplementary ripple-cancellation current into a circuit node such as a node K as described hereinabove. The supplementary ripple-cancellation circuit senses a scaled error voltage, i.e., a voltage that excludes the voltage across a blocking capacitor, and injects the supplementary ripple-cancellation current to correct inaccuracies introduced by finite size of the blocking capacitor, e.g., capacitor C1, and by resistance of the secondary portion of the circuit, e.g., resistance of a damping resistor $R_{damp}$ and ESR of the blocking capacitor C1. Node J, to which the supplementary ripple-cancellation circuit illustrated in FIG. 14 can be coupled, is illustrated in FIGS. 4, 5, 6, and 11. Ideally, a ripple cancellation circuit as described herein can produce near-perfect ripple cancellation if blocking capacitor C1 is sufficiently large, if ripple-cancellation inductor Lrc is accurate, and if circuit parasitic effects such as uncompensated interwinding capacitance in magnetic circuit elements are minimal or are compensated as described previously hereinabove. Supplementary ripple-cancellation circuit 1400 accommodates smaller values of blocking capacitance and its ESR. Supplementary ripple-cancellation circuit 1400 is also operable, without limitation, with the circuits illustrated in FIGS. 7, 8, 12, and 13. Supplementary ripple cancellation circuit 1400 can advantageously be constructed with small, reactive components in view of the low voltage typically produced across one or more voltage-sensing windings in series with a ripple-cancellation inductor, and the relatively small supplementary ripple-cancellation current that it injects.

Exemplary component values for the supplementary ripple-cancellation circuit illustrated in FIG. 14 coupled to the circuit illustrated in FIG. 11 are provided in Table III below:

TABLE III

| | |
|---|---|
| Inductance of inductor L1 (ref. primary) | 10 µH |
| Inductance of inductor L2 (ref. primary) | 10 µH |
| Np1:Nrc1 | 7:1 |
| Np2:Nrc2 | 7:1 |
| Lrc | 1.022 µH |
| C1 | 4 µF |
| Cout | 0.5 µF |
| Npsup:Nssup | 3:1 |
| Lrcsup | 0.365 µH |
| C2 | 4 µF |
| Cp1 = Cp2 | 100 pF |
| Crc | 980 pF |

Thus, a supplementary ripple-cancellation circuit has been introduced that advantageously provides a high level of ripple cancellation by providing a small, supplementary ripple-cancellation inductor as an alternative to a large blocking capacitor.

A power converter can be designed using techniques and methods introduced herein with higher power conversion density and with higher power conversion efficiency than has been achievable using techniques and methods of the prior art.

Those skilled in the art should understand that the previously described embodiments of a current doubler rectification circuit are submitted for illustrative purposes only and other embodiments capable of providing reduced output ripple voltage are well within the broad scope of the invention. Additionally, exemplary embodiments of the invention have been illustrated with reference to specific electronic components. Those skilled in the art are aware, however, that components may be substituted (not necessarily with components of the same type) to create a desired condition or accomplish a desired result. For instance, multiple components may be substituted for a single component and vice-versa. Series circuit arrangements of particular circuit elements may be interchanged within the broad scope of the invention. The principles of the invention may be applied to a wide variety of power circuit topologies, including topologies employing a variety of transformer reset schemes, such as resonant reset. Additionally, the current doubler rectification circuits of the invention may be used with other rectification switching arrangements in a power converter, and with power converters providing more than one output voltage. For a better understanding of a variety of power converter topologies employing discrete and integrated magnetic techniques, see Modern DC-to-DC Switchmode Power Converter Circuits, by Rudolph P. Severns and Gordon Bloom, Van Nostrand Reinhold Company, New York, N.Y. (1985), and for a better understanding of power electronics, see "Principles of Power Electronics," by J. G. Kassakian, M. F. Schlecht and G. C. Verghese, Addison-Wesley (1991), which are incorporated herein by reference.

Although the invention has been described in detail, those skilled in the art should understand that they can make various changes, substitutions and alterations herein without departing from the spirit and scope of the invention in its broadest form.

What is claimed is:

1. A power converter including an input and an output, comprising:
    a rectification circuit, coupled to said input, including a first magnetic circuit element including a first primary winding and a first voltage-sensing winding, and a second magnetic circuit element including a second primary winding and a second voltage-sensing winding, said first and second primary windings coupled in series and to said input, said first and second voltage-sensing windings coupled in series, each of said first and second voltage-sensing windings having a polarity to produce a scaled difference of voltages applied to said primary windings, wherein said first voltage-sensing winding is coupled with an opposite polarity to a polarity of said first primary winding;
    an inductor coupled in series with said voltage-sensing windings; and
    a capacitor coupled in series with said inductor and said output.

2. The power converter as recited in claim 1 wherein said rectification circuit is a current-doubler rectification circuit.

3. The power converter as recited in claim 1 wherein said first and second magnetic circuit elements are transformers.

4. The power converter as recited in claim 1 further comprising a another capacitor coupled in parallel with said inductor.

5. The power converter as recited in claim 1 wherein said rectification circuit further comprises a first diode and a second diode coupled, respectively, to a winding of said first and second magnetic circuit elements, and wherein said first and second diodes are coupled to said output.

6. The power converter as recited in claim 1 wherein said first and second magnetic circuit elements are formed as an integrated magnetics structure.

7. The power converter as recited in claim 1 wherein said first and second voltage-sensing windings are configured to sense a scaled difference of voltages produced across said first and second magnetic circuit elements.

8. The power converter as recited in claim 1 further comprising another magnetic circuit element coupled to said first voltage-sensing winding to reduce an effective number of turns of said first voltage-sensing winding.

9. The power converter as recited in claim 1 wherein said second voltage-sensing winding is coupled with a same polarity as a polarity of said second primary winding.

10. A power converter, comprising:
    a filter comprising first and second magnetic circuit elements forming two current paths coupled to a node;
    a first voltage-sensing winding in said first magnetic circuit element coupled in series to a second voltage-sensing winding in said second magnetic circuit element, said voltage-sensing windings configured to sense a scaled difference of voltages produced across said first and second magnetic circuit elements in said filter;
    an inductor coupled in series with said first and said second voltage-sensing windings;
    a first capacitor coupled in series with said inductor and said node; and
    a second capacitor coupled in parallel with said inductor.

11. The power converter as recited in claim 10 wherein said first and second voltage-sensing windings are coupled in series and to said node to form a third current path coupled to said node.

12. A method of constructing a power converter including an input and an output, the method comprising:
    forming a first magnetic circuit element with a first primary winding and a first voltage-sensing winding;
    forming a second magnetic circuit element with a second primary winding and a second voltage-sensing winding;
    coupling said first and second primary windings in series and to said input;
    coupling said first and second voltage-sensing windings in series with a coupling polarity to produce a scaled difference of voltages applied to said first and second primary windings;
    coupling an inductor in series with said second voltage-sensing winding;
    coupling a first capacitor in series with said inductor and said output; and coupling a second capacitor in parallel with said inductor.

13. The method as recited in claim 12 wherein said first voltage-sensing winding is formed with a polarity opposite to a polarity of said first primary winding, and wherein said second voltage-sensing winding is formed with a same polarity as a polarity of said second primary winding.

14. The method as recited in claim 12 wherein said first and second magnetic circuit elements are formed as an integrated magnetics structure.

15. The method as recited in claim 12 further including coupling another magnetic circuit element to said first voltage-sensing winding to reduce an effective number of turns of said first voltage-sensing winding.

16. A method of constructing a power converter, comprising:
    forming a filter with two magnetic circuit elements and two current paths formed with secondary windings of said two magnetic circuit elements, and coupling said two current paths together at a node;
    coupling first and second primary windings, respectively, of said two magnetic circuit elements in series;
    sensing a scaled difference of voltages produced across said primary windings, wherein said scaled difference of voltages is sensed with a first and a second voltage-sensing winding, respectively, in said two magnetic circuit elements, and wherein said first voltage-sensing winding is coupled to said first primary winding with opposite polarity to a polarity of said first primary winding;
    coupling said scaled difference of voltages to an inductor; and
    coupling a capacitor in series with said inductor and said node.

17. The method as recited in claim 16 wherein said first and second voltage-sensing windings are coupled in series.

18. The method as recited in claim 16 further including coupling another capacitor in parallel with said inductor.

19. The method as recited in claim 16 wherein said second voltage-sensing winding is coupled to said second primary winding with a same polarity as a polarity of said second primary winding.

20. The method as recited in claim 16 wherein said scaled difference of voltages is scaled with a turns ratio in a magnetic circuit element before coupling to said inductor.

* * * * *